(12) United States Patent
Chunduri et al.

(10) Patent No.: US 11,589,291 B2
(45) Date of Patent: Feb. 21, 2023

(54) BIG PACKET PROTOCOL MOBILITY INSTRUCTIONS FOR 5G HANDOVERS

(71) Applicant: HUAWEI TECHNOLOGIES CO., LTD., Shenzhen (CN)

(72) Inventors: Uma S. Chunduri, Fremont, CA (US); Alexander Clemm, Los Gatos, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 119 days.

(21) Appl. No.: 17/100,537

(22) Filed: Nov. 20, 2020

(65) Prior Publication Data

US 2021/0076299 A1    Mar. 11, 2021

Related U.S. Application Data

(63) Continuation of application No. PCT/US2019/036727, filed on Jun. 12, 2019.
(Continued)

(51) Int. Cl.
*H04W 40/36* (2009.01)
*H04L 1/16* (2006.01)
*H04W 36/02* (2009.01)
*H04W 36/08* (2009.01)
*H04L 1/1607* (2023.01)

(52) U.S. Cl.
CPC ........... *H04W 40/36* (2013.01); *H04L 1/1642* (2013.01); *H04W 36/02* (2013.01); *H04W 36/08* (2013.01)

(58) Field of Classification Search
CPC ..... H04W 40/36; H04W 36/02; H04W 36/08; H04W 36/0011; H04W 76/22; H04L 1/1642
See application file for complete search history.

(56) References Cited

U.S. PATENT DOCUMENTS 9,934,273 B1    4/2018  MacCarthaigh
2014/0280717 A1*  9/2014  Frost .................... H04L 45/566
709/217
(Continued)

FOREIGN PATENT DOCUMENTS

EP    2985971 A1    2/2016

OTHER PUBLICATIONS

Li, R., et al., U.S. Appl. No. 62/565,211, Title: "Self-Driving Packets with Conditional Instructions"; filed Sep. 29, 2017.
(Continued)

*Primary Examiner* — Chi H Pham
*Assistant Examiner* — Ji-Hae Yea
(74) *Attorney, Agent, or Firm* — Conley Rose, P.C.

(57) ABSTRACT

A mechanism is disclosed for performing data plane based routing during a handover. The mechanism includes executing a user plane function (UPF). An uplink packet is received from a user equipment (UE) anchored to a fifth generation radio access network (5G) base station (gNB). The uplink packet includes a change destination command, a destination field, and metadata including a destination address for the uplink packet. A change destination command in the uplink packet is executed by setting the destination field of the uplink packet to the destination address in the metadata. The uplink packet is transmitted to the destination address set in the destination field.

19 Claims, 13 Drawing Sheets

Related U.S. Application Data

(60) Provisional application No. 62/684,041, filed on Jun. 12, 2018.

(56) References Cited

U.S. PATENT DOCUMENTS

| | | | |
|---|---|---|---|
| 2016/0043940 A1* | 2/2016 | Mahadevan | H04L 63/10 709/223 |
| 2016/0105838 A1* | 4/2016 | Wang | H04W 40/04 370/329 |
| 2019/0104075 A1 | 4/2019 | Li et al. | |

OTHER PUBLICATIONS

"3rd Generation Partnership Project; Technical Specification Group Services and System Aspects; GPRS enhancements for E-UTRAN access (Release 8)," 3GPP TS 23.401 V1.1.0, Jul. 2007, 77 pages.

"3rd Generation Partnership Project; Technical Specification Group Services and System Aspects; Architecture enhancements for non-3GPP accesses (Release 16)," 3GPP TS 23.402, V16.0 0, Jun. 2019, 314 pages.

"3rd Generation Partnership Project; Technical Specification Group Services and System Aspects; System Architecture for the 5G System (5GS); Stage 2 (Release 16)," 3GPP TS 23.501 V16.2.0, Sep. 2019, 391 pages.

"3rd Generation Partnership Project; Technical Specification Group Services and System Aspects; Procedures for the 5G System (5GS); Stage 2 (Release 16),"' 3GPP TS 23 502 V16 6.0, Sep. 2020, 597 pages.

"3rd Generation Partnership Project; Technical Specification Group Services and System Aspects; Policy and charging control framework for the 5G System (5GS); Stage 2 (Release 16),"3GPP TS 23.503 V16.6.0, Sep. 2020, 118 pages.

\* cited by examiner

600

BPP Header

| ver. | x | ea | e | v | len. | meta | r | next proto |
|---|---|---|---|---|---|---|---|---|
| ttl ||||| tu | t | resvd. ||

Command Header

| len. | n | s | c |
|---|---|---|---|

FIG. 7

Condition

Parameter contents

BIG PACKET PROTOCOL MOBILITY INSTRUCTIONS FOR 5G HANDOVERS

CROSS-REFERENCE TO RELATED APPLICATIONS

This patent application is a continuation of International Application No. PCT/US2019/036727, filed Jun. 12, 2019 by Uma Chunduri, et. al., and titled "Big Packet Protocol Mobility Instructions for 5G Handovers," which claims the benefit of U.S. Provisional Patent Application No. 62/684,041, filed Jun. 12, 2018 by Uma Chunduri, et. al., and titled "Big Packet Protocol Mobility Instructions for 5G Handover Scenarios," which are hereby incorporated by reference.

TECHNICAL FIELD

The present disclosure is generally related to device mobility in fifth generation radio access network (5G) networks, and is specifically related to employing in-band signaling to manage handovers between 5G network cells in order to reduce handover signaling traffic.

BACKGROUND

Radio access networks (RANs) are implemented to allow cellular devices to move between base stations. Specifically, a cellular device may connect wirelessly to a base station. The cellular device can then establish a data connection with a network via the base station. The base station is generally selected from a group of base stations, where the selected base station has the best signal characteristics, for example based on distance between the base station and the cellular device, signal power of the base station, etc. As the cellular device moves, the signal characteristics may change. As such, the cellular device may connect to a new base station with the best signal characteristics. To manage such movements without service interruptions, tunnels may be set up between various network devices to ensure communications arrive at the appropriate communication end points. Such tunnels can be set up and can be created by control plane signaling. In such a scheme, rapid movement of cellular devices between base stations may result in significant control plane signaling to manage such tunnels.

SUMMARY

In an embodiment, the disclosure includes a method implemented in a network element (NE) including a user plane function (UPF). The method comprises executing, by a processor of the NE, the UPF. The method further comprises receiving, by a downstream receiver of the NE, an uplink packet from a user equipment (UE) anchored to a fifth generation radio access network (5G) base station (gNB), wherein the uplink packet includes a change destination command, a destination field, and metadata including a destination address for the uplink packet. The method further comprises executing, by the processor, the change destination command in the uplink packet by setting the destination field of the uplink packet to the destination address in the metadata. The method further comprises transmitting, by an upstream transmitter of the NE, the uplink packet to the destination address set in the destination field. In some RAN systems, tunnels are used to route packets from a UE to a base station, from the base station to core network gateway, and from the gateway to correspondent node. These tunnels are set up and torn down with control plane messaging. 5G cells are smaller than fourth generation radio access network (4G) cells and service more devices. So handovers occur more often and occur for more devices. This significantly increases the amount of control plane signaling to manage such tunnels. The abovementioned mechanism can omit tunnels, and hence omit associated control plane signaling for tunnel set up and tear down. Specifically, the gNB or other device in the RAN can determine the correct UPF for an uplink packet for a UE, store the final destination address in packet metadata, set the packet destination as the UPF, and include a change destination command. Upon receiving the change destination command, the UPF can execute the change destination command to obtain the final destination from metadata and can route accordingly. In this way, the gNB can direct the packet through whichever UPF is the correct UPF at a specified time without needing to use tunnels. The same process works in reverse for downstream packets. Accordingly, the packets get routed to whichever gNB the UE is attached to, which allows for omission of tunnel set up and tear down during UE handover.

Optionally, in any of the preceding aspects, another implementation of the aspect provides, wherein the destination field is set to an address of the UPF prior to execution of the change destination command.

Optionally, in any of the preceding aspects, another implementation of the aspect provides, wherein the change destination command is a conditional command set to initiate the change destination command only at the NE including a network address associated with the UPF. The change address includes a condition set to the UPF. This ensures only the UPF changes the address, and hence the packet is routed through the UPF.

Optionally, in any of the preceding aspects, another implementation of the aspect provides, further comprising receiving, by an upstream receiver of the NE, a downlink packet from a correspondent node, wherein the downlink packet includes a destination field set to the UE. The method further comprises determining, by the processor, that the UE is anchored to the gNB. The method further comprises setting, by the processor, the destination field of the downlink packet to an address of the gNB. The method further comprises writing, by the processor, an address of the UE into metadata of the downlink packet. The method further comprises writing, by the processor, a change destination command into the downlink packet, wherein the change destination command in the downlink packet directs the gNB to set the destination field of the downlink packet to the UE address in the metadata. The method further comprises transmitting, by a downstream transmitter of the NE, the downlink packet to the gNB based on the destination field. The present aspect includes the downlink case. The packet is routed to whichever gNB is currently anchoring the UE. The UE address is retained in metadata so that the UE address can be used by the gNB to find the UE. In this way, handover based tunnels can be omitted.

Optionally, in any of the preceding aspects, another implementation of the aspect provides, wherein the uplink packet and the downlink packet are communicated between the UPF and the gNB without traversing a network tunnel.

In an embodiment, the disclosure includes a method implemented in a NE including a UPF. The method comprises executing, by a processor of the NE, the UPF. The method further comprises receiving, by a receiver of the NE, an indication that a UE has initiated a handover between a source gNB and a destination gNB. The method further comprises receiving, by the receiver, a first downlink packet sent from a correspondent node to the UE. The method further comprises writing, by the processor, a start buffering command into the first downlink packet. The method further comprises transmitting, by a transmitter of the NE, the first downlink packet to the destination gNB. Some RANs create a tunnel between the gateway and the destination eNB upon handover and uses control plane signaling to manage buffering. The present aspect uses conditional commands that direct the buffering process in the data plane on packets that are being sent as part of a communication session. This allows for omission of separate control plane signaling for buffer management. The present aspect discloses the start buffering message.

Optionally, in any of the preceding aspects, another implementation of the aspect provides, further comprising receiving, by the receiver, a second downlink packet sent from the correspondent node to the UE. The method further comprises determining, by the processor, that the handover of the UE to the destination gNB is not complete. The method further comprises writing, by the processor, a keep buffering command into the second downlink packet. The method further comprises transmitting, by the transmitter, the second downlink packet to the destination gNB. The present aspect discloses messaging to continue buffering while a handover is in progress.

Optionally, in any of the preceding aspects, another implementation of the aspect provides, further comprising receiving, by the receiver, a third downlink packet sent from the correspondent node to the UE. The method further comprises receiving, by the receiver, an indication that the handover of the UE to the destination gNB is complete. The method further comprises writing, by the processor, a buffer release command into the third downlink packet. The method further comprises transmitting, by the transmitter, the third downlink packet to the destination gNB to direct the destination gNB to release all buffered downlink packets to the UE. The present aspect discloses messaging to release the buffer contents when the handover is complete.

Optionally, in any of the preceding aspects, another implementation of the aspect provides, wherein the start buffering command, the keep buffering command, and the buffer release command are conditional commands set to control buffering only at a node with an address associated with the destination gNB. The change address includes a condition set to the UPF. This ensures only the UPF changes the address, and hence the packet is routed through the UPF.

Optionally, in any of the preceding aspects, another implementation of the aspect provides, wherein the first downlink packet includes a destination field containing an address of the UE, the method further comprising setting, by the processor, the destination field of the first downlink packet to an address of the destination gNB. The method further comprises writing, by the processor, the UE address into metadata of the first downlink packet. The method further comprises writing, by the processor, a change destination command into the first downlink packet, wherein the change destination command in the first downlink packet directs the destination gNB to set the destination field of the first downlink packet to the UE address in the metadata.

Optionally, in any of the preceding aspects, another implementation of the aspect provides, further comprising writing, by the processor, increasing sequence numbers in metadata of the first downlink packet, the second downlink packet, and the third downlink packet. This aspect includes the communication of sequence values in metadata of the buffered packets. The sequence values can be used by the gNB to ensure packets are sent to the UE in the proper order.

Optionally, in any of the preceding aspects, another implementation of the aspect provides, wherein the first downlink packet, the second downlink packet, and the third downlink packet are transmitted between the UPF and the destination gNB without traversing a network tunnel.

In an embodiment, the disclosure includes a method implemented in a gNB. The method comprises receiving, by a downstream receiver of the gNB, an uplink packet from a UE, wherein the uplink packet includes a destination field set to a correspondent node. The method further comprises determining, by a processor of the gNB, a UPF associated with the uplink packet. The method further comprises setting, by the processor, the destination field of the uplink packet to an address of the UPF. The method further comprises writing, by the processor, an address of the correspondent node into metadata of the uplink packet. The method further comprises writing, by the processor, a change destination command into the uplink packet, wherein the change destination command in the uplink packet directs the UPF to set the destination field of the uplink packet to the correspondent node address in the metadata. The method further comprises transmitting, by an upstream transmitter of the gNB, the uplink packet to the UPF based on the destination field. In some RAN systems, tunnels are used to route packets from a UE to a base station, from the base station to core network gateway, and from the gateway to correspondent node. These tunnels are set up and torn down with control plane messaging. 5G cells are smaller than fourth generation radio access network (4G) cells and service more devices. So handovers occur more often and occur for more devices. This significantly increases the amount of control plane signaling to manage such tunnels. The above-mentioned mechanism can omit tunnels, and hence omit associated control plane signaling for tunnel set up and tear down. Specifically, the gNB or other device in the RAN can determine the correct UPF for an uplink packet for a UE, store the final destination address in packet metadata, set the packet destination as the UPF, and include a change destination command. Upon receiving the change destination command, the UPF can execute the change destination command to obtain the final destination from metadata and can route accordingly. In this way, the gNB can direct the packet through whichever UPF is the correct UPF at a specified time without needing to use tunnels. The same process works in reverse for downstream packets. Accordingly, the packets get routed to whichever gNB the UE is attached to, which allows for omission of tunnel set up and tear down during UE handover.

Optionally, in any of the preceding aspects, another implementation of the aspect provides, wherein the change destination command is a conditional command set to initiate the change destination command only at a network element (NE) including a network address associated with the UPF.

Optionally, in any of the preceding aspects, another implementation of the aspect provides, further comprising receiving, by an upstream receiver of the gNB, a downlink packet from the UPF, wherein the downlink packet includes a change destination command and a destination field set as the gNB. The method further comprises executing, by the processor, the change destination command in the downlink packet by setting the destination field of the downlink packet to a destination address of the UE in the metadata. The method further comprises transmitting, by a downstream transmitter of the gNB, the downlink packet to the UE at the destination address set in the destination field.

Optionally, in any of the preceding aspects, another implementation of the aspect provides, wherein the uplink packet and the downlink packet are communicated between the UPF and the gNB without traversing a network tunnel.

Optionally, in any of the preceding aspects, another implementation of the aspect provides, wherein the downlink packet includes a start buffering command, the method further comprising executing, by the processor, the start buffering command by obtaining, by the processor, a sequence number of the downlink packet from downlink packet metadata, storing, by the processor, the downlink packet and the sequence number in a buffer of the gNB.

Optionally, in any of the preceding aspects, another implementation of the aspect provides, wherein the downlink packet includes a keep buffering command, the method further comprising executing, by the processor, the keep buffering command by obtaining, by the processor, a sequence number of the downlink packet from downlink packet metadata, and storing, by the processor, the downlink packet and the sequence number in a buffer of the gNB.

Optionally, in any of the preceding aspects, another implementation of the aspect provides, wherein the downlink packet includes a release buffer command, the method further comprising executing, by the processor, the release buffer command by transmitting to the UE, by the downstream transmitter, packets stored in the buffer based on sequence numbers for the packets.

In an embodiment, the disclosure includes a NE comprising a processor, a transmitter coupled to the processor, a receiver coupled to the processor, wherein the processor, transmitter, and receiver are configured to perform the method of any of the preceding aspects.

In an embodiment, the disclosure includes a non-transitory computer readable medium comprising a computer program product for use by a NE, the computer program product comprising computer executable instructions stored on the non-transitory computer readable medium such that when executed by a processor cause the NE to perform the method of any of the preceding aspects.

In an embodiment, the disclosure includes a NE comprising a UPF means for executing a UPF. The NE further comprises a receiving means for receiving an uplink packet from a UE anchored to a gNB, wherein the uplink packet includes a change destination command, a destination field, and metadata including a destination address for the uplink packet. The NE further comprises a change destination means for executing the change destination command in the uplink packet by setting the destination field of the uplink packet to the destination address in the metadata. The NE further comprises a transmitting means for transmitting the uplink packet to the destination address set in the destination field.

In an embodiment, the disclosure includes a NE comprising: a gNB means for operating a gNB. The NE further comprises a receiving means for receiving an uplink packet from a UE, wherein the uplink packet includes a destination field set to a correspondent node. The NE further comprises a UPF determination means for determining a UPF associated with the uplink packet. The NE further comprises an addressing means for setting the destination field of the uplink packet to an address of the UPF. The NE further comprises a metadata writing means for writing an address of the correspondent node into metadata of the uplink packet. The NE further comprises a change destination command means for writing a change destination command into the uplink packet, wherein the change destination command in the uplink packet directs the UPF to set the destination field of the uplink packet to the correspondent node address in the metadata. The NE further comprises a transmitting means for transmitting the uplink packet to the UPF based on the destination field.

Optionally, in any of the preceding aspects, another implementation of the aspect provides, wherein the NE is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6 is a schematic diagram of an example BPP header encoding that can be used to support data plane handover signaling.

FIG. 7 is a schematic diagram of an example command header encoding that can be used to support data plane handover signaling.

DETAILED DESCRIPTION

Figure 1:
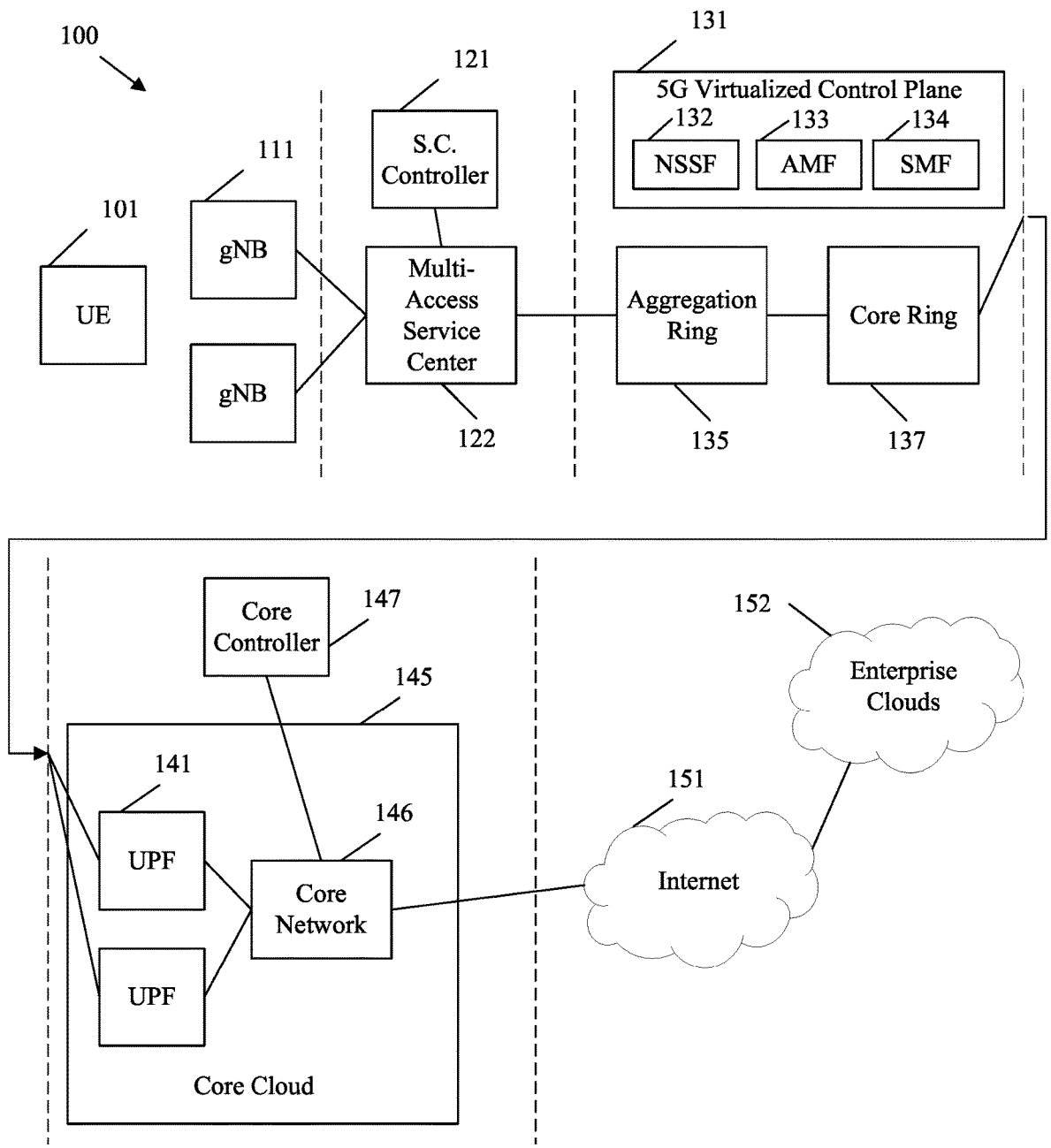
FIG. 1 is a schematic diagram of an example 5G network.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following are definitions for several terms as used in the present disclosure. Fifth generation radio access network (5G) is a next generation set of network technology configured to manage data connections on behalf of mobile devices. Fourth generation radio access network (4G) is a current generation set of network technology configured to manage data connections on behalf of mobile devices. User equipment (UE) is any of a broad category of mobile devices capable of performing wireless data communications. Big Packet Protocol (BPP) is a network communication protocol used for implementing self-driving packets. A self-driving packet is a data packet that contains a block or set of fields that define a set of conditional commands used to guide processing of the packet by a forwarding device (e.g., a network node such as a router, base station, server operating virtual forwarding functions, etc.). A conditional command is a command whose execution depends on a condition being met. A data plane (DP), which can also be referred to as a user plane, a forwarding plane, a carrier plane, and/or a bearer plane, is the part of a network that carries user traffic. The control plane (CP) is the part of the network that manages network topology and employs signaling to control the routing of user traffic as employed by the DP. A handover (HO) is a procedure of shifting UE wireless connectivity between base stations. A 5G base station (gNB) is a network device that acts as an anchor point for providing a UE communication access to a 5G network. Access and mobility management function (AMF) is a 5G technology in the CP that is configured to manage connection and mobility tasks for UEs that are wirelessly connected to a 5G network. Session management function (SMF) is a 5G technology in the CP configured to interact with the DP in order to control, maintain, and update communication sessions for UEs. A user plane function (UPF) is a 5G technology in the DP configured to manage routing and forwarding of UE traffic in a 5G network. A mobility management entity (MME) is a CP device in a 4G network that employs signaling to control UE mobility between base stations. A serving gateway (SGW) is a network device configured to perform routing and forwarding of UE traffic in a 4G network. A packet data network gateway (PGW) is a network device configured to perform policy enforcement, packet screening, and other security features for UE traffic in a 4G network. In 4G, the PGW and SGW are generally positioned on the same device. A significant change between 4G and 5G is the decoupling of SGW and the PGW, which results in a separate UPF and policy control function (PCF) that can be managed in different portions of the network.

In a 4G network, handover procedures are employed to shift UE wireless connectivity between Evolved Node Bs (eNBs). Prior to the handover, the UE connects to a source eNB, which communicates with a SGW/PGW via a tunnel. A 4G handover includes a decision and request phase, a preparation phase, a path switch phase, and a complete phase. The decision and request phase is initiated after a UE performs radio resource control (RRC) measurements, which are reported to the source eNB and results in a determination that a handover should occur from the source eNB to a destination eNB with better signal characteristics. During the decision and request phase, the source eNB sends a HO request to a MIME, the MME acknowledges the HO request from the source eNB, the MME creates a tunnel between the SGW/PGW and the destination eNB, and the MME creates a tunnel between the source eNB and the destination eNB. During the preparation phase, the source eNB sends a RRC reconfiguration request to the UE to cause the UE to update radio parameters, the UE reconfigures the destination eNB by updating a transfer status and performing radio connection procedures to connect to the destination eNB, and the source eNB shares sequence numbers related to communication packets with the destination eNB. At this point, the UE continues to send uplink data via the source eNB, while downlink data is forwarded from the SGW/PGW to the destination eNB via the corresponding tunnel and buffered. During the path switch phase, the buffered data is released from the destination eNB to the UE, the path switch procedure between the UE and the destination eNB is completed, and a modify bearer procedure is completed between the MME and the SGW/PGW to update bearer identifiers. At this point, the uplink data is forwarded from the UE to the source eNB, to the destination eNB via the corresponding tunnel, and from the destination eNB to the SGW/PGW via the corresponding tunnel. Meanwhile, the downlink data is forwarded from the SGW/PGW to the destination eNB via the corresponding tunnel and then forwarded on to the UE. During the complete phase, the uplink path is switched so that the uplink packets are sent from the UE to the destination eNB and to the SGW/PGW. At this stage, both the uplink and downlink traffic traverse the destination eNB and no longer traverse the source eNB. Further, a path switch acknowledgement is sent from the SGW/PGW to the MME. Also, the tunnel between the source eNB and the SGW/PGW and the tunnel between the source eNB and the destination eNB are released by the MME. As shown by the preceding discussion, handovers in 4G are complex and employ a significant amount of signaling between the control plane and the data plane to complete the transition between eNBs.

5G proposes to allow for a greater number of devices to connect to the network at greater speeds than 4G. This may be accomplished by employing gNBs that communicate with UEs at higher frequencies than may be employed in 4G. Such higher frequency 5G signals may have a shorter effective range than 4G signals. As a consequence, 5G may employ smaller cells than 4G. A greater number of UEs and smaller cells may result in significantly more handovers occurring in 5G than occur in 4G. The 4G handover procedure may employ too much signaling overhead to allow for the increased number of handovers in 5G. Further, higher speed communications may require higher speed handovers to prevent buffer overruns at the gNBs for downlink traffic. Due to the amount of overhead signaling, the 4G handover procedure may introduce too much latency to allow for UE transitions when receiving high speed downloads.

Disclosed herein are data plane based signaling mechanisms to support UE handovers in 5G networks. Such signaling mechanisms may allow network tunnels to be omitted from handover procedures. This removes signaling overhead associated with setting up and tearing down network tunnels during handovers. Specifically, the disclosed examples employ conditional commands as part of BPP to manage packet routing during handovers. In the upstream direction, a gNB may receive an uplink packet from the UE with a destination address set to a correspondent node in the network. The gNB writes a correspondent node address into uplink packet metadata and writes the address of a UPF for the communication as the destination address. This ensures the uplink packet is routed to the proper UPF. The gNB also writes a change address command into the uplink packet with a condition set to the address of the UPF. Accordingly, when the UPF receives the packet, the condition is satisfied and the UPF executes the conditional command by moving the correspondent node address from metadata back into the destination address. A similar process may also be employed in the downlink direction. For example, the UPF may receive a downlink packet from the correspondent node with a destination address set as the address of the UE. The UPF places the UE address into the metadata, sets the gNB as the destination address, and sets a change destination command in the downlink packet with a condition set as the address of the gNB. Accordingly, the UPF receives the downlink packet, executes the change destination command, moves the UE address from the metadata to the destination address, and forwards the downlink packet to the UE. The result is the uplink packet is always forwarded to the current UPF and the downlink packet is always forwarded to the current gNB. In the event of a handover (or change in UPF), the destination gNB or updated UPF is added to the packet, which ensures the packet is communicated to the proper destination. In this way, network tunnels need not be used, and hence signaling for network tunnel set up and tear down may be omitted from the handover procedures. Further, the DP based signaling mechanism attaches commands to packets that are already in route (e.g., adding forty bytes or eighty bytes to the messages for internet protocol (IP) version four (IPv4) and IP version six (IPv6), respectively), and hence need not replace network tunnel management mechanisms with separate messages. This reduces overall signaling overhead for packet routing when managing handovers, and hence reduces overall network congesting when managing large numbers of devices performing repeated handovers when traversing small network cells in 5G. The disclosure also provides mechanisms to manage buffering in the DP, which may remove buffering control signaling from the CP. Specifically, upon receiving a notification of a handover, the UPF can include a start buffering command into downlink packets with a condition set as the gNB (e.g., the destination gNB). The gNB can then execute the command and buffer the downlink packet. A keep buffering command may be inserted into subsequent downlink packets to cause the gNB to continue buffering each subsequent downlink packet. Once the handover is complete, the UPF can include a release buffer command into a downlink packet to cause the gNB to forward the buffered packets to the UE. This approach may allow CP based messages that control buffering to be omitted during the handover procedure. This example may further reduce aggregate signaling overhead during UE handovers.

FIG. 1 is a schematic diagram of an example 5G network 100. The 5G network 100 is configured to provide data and/or voice connectivity to a UE 101. A UE 101 is any of a wide range of devices capable of wirelessly communicating data and/or voice over a network. For example, a UE 101 may include a cellular phone, a smart phone, a tablet computer, a personal computer, a laptop, an internet of things (IoT) device, etc.

The UE 101 wirelessly connects to the 5G network 100 via a gNB 111. A gNB 111 is a base station equipped to act as an access point for a UE 101 into the 5G network 100. A gNB 111 employs a downstream wireless interface for communicating with one or more UEs 101. While only one UE 101 is depicted, it should be noted that a gNB 111 may simultaneously communicate with multiple UEs 101. Compared with an eNB, the gNB 111 may communicate at higher frequencies and may have a shorter effective range in some cases. The gNB 111 may receive uplink packets from the UE 101 as well as transmit downlink packets to the UE 101 over a downstream wireless interface. A UE 101 may have access to multiple gNBs 111, and may employ a handover procedure to move connections between gNBs 111 based on distance, signal strength, available bandwidth, etc. The gNB 111 also includes an upstream interface for communicating with other devices in the network 100.

The gNBs 111 are coupled to a multi-access service center 122, which is controlled by a service center controller 121. Specifically, the multi-access service center 122 may couple to one or more gNBs 111 and provide services to any UE 101 that is wirelessly connected to such gNBs 111. The network 100 may include many multi-access service centers 122 placed in close proximity to the attached gNBs 111. The multi-access service center 122 may provide local caches and/or radio access network (RAN) functionality to support communications by the attached gNBs 111. The multi-access service center 122 may include servers, routers, memory caches, etc., which may be organized in a cloud model. Accordingly, the service center controller 121 may dynamically allocate various hardware components to perform various tasks for the attached gNBs 111.

The multi-access service centers 122 are connected to a core network 146 via one or more aggregation rings 135 connected to one or more core rings 137. The aggregation rings 135 each include a plurality of interconnected routers capable of combining the connections from the multi-access service centers 122 for communication with the upstream portions of the network 100. The core rings 137 include a plurality of interconnected routers capable of combining the connections from one or more aggregation rings 135 into the core network 146. In this way, an arbitrary large number of gNBs 111 placed in many different locations can be interconnected, and corresponding communications can be aggregated, for input into the core network 146 in the upstream direction and for receiving output from the core network 146 in the downstream direction.

The routing between the multi-access service centers 122 and the core network 146 can be controlled by a 5G virtualized control plane 131. Specifically, the 5G virtualized control plane 131 determines how routing and other control functions should occur and communicates such decisions to the data plane. The data plane then carries out those instructions. The data plane may include the routers and/or routing functions in the aggregation rings 135 and the core ring 137. In some instances, the 5G virtualized control plane 131 may also manage data plane functions by routers/routing functions in the multi-access service centers 122 and a core cloud 145. For example, the 5G virtualized control plane 131 may be implemented on the service center controller 121, a core controller 147, various controllers for the aggregation ring 135 and core ring 137, or combinations thereof. The 5G virtualized control plane 131 includes a plurality of virtualized functions, and hence may be implemented by dynamically allocating hardware resources across a plurality of controllers, servers, or other compute capable network nodes.

The 5G virtualized control plane 131 comprises many functions as defined by the 3rd Generation Partnership Project (3GPP). For clarity of discussion, only a subset of such functions are shown and described. For example, the 5G virtualized control plane 131 may include a network slice selection function (NSSF) 132, an access and mobility management function (AMF) 133, a session management function (SMF) 134, etc. Network 100 may be implemented to virtualize and dynamically provide hardware resources from the network 100 for use by the UE 101 as slices. A slice is a virtual network implemented on a shared infrastructure. The NSSF 132 supports creating and/or providing the UE 101 access to relevant slices of the network 100, and may also assign an AMF 133 to the UE 101. The AMF 133 performs authentication, connection management, security context management, registration, and mobility management for UE 101. The SMF 134 manages communication sessions for the UE 101, for example by managing addresses, performing traffic steering, establishing/terminating sessions, and providing corresponding notifications. As noted above, the 5G virtualized control plane 131 provides these services as well as others for the UE 101, and hence provides the overall management functions that inform the UE 101, as well as other network nodes, how communication with the network 100 should occur.

The core ring 137 is coupled to a core cloud 145 and a core controller 147. The core cloud 145 is controlled by the core controller 147. The core cloud 145 and core controller 147 collectively provide virtualized network edge services for the network 100. For example, the core cloud 145 may include a plurality of servers, routers, switches, etc. coupled together according to a cloud computing model. Such devices, or portions thereof, can be categorized as memory resources, network resources, processing/compute resources, etc. The core controller 147 comprises a network node with at least communication and processing capabilities. The core controller 147 is configured to monitor the status of the core cloud 145 and elastically/dynamically assign resources from the core cloud 145 to perform requested tasks. Such tasks include network edge services. A network edge service is any task applied at an entry point and/or exit point to the core network 146. Such tasks may include network security, firewalls, parental control, device authentication, policy enforcement, caching, content data network (CDN), charging and analytics, etc. Further, latency sensitive tasks may be performed in the core cloud 145, as this approach positions corresponding services closer to the end user (e.g., the UE 101) than performing such tasks in an enterprise cloud 152. For example, latency sensitive tasks may include emergency response systems, online gaming systems, virtual reality systems, autonomous vehicle control systems, certain internet of things (IoT) applications, or other tasks where response time is critical to the preferred functionality of the system provided to the end user. Accordingly, the core cloud 145 may provide low latency services to the UE 101, based on an allocation by the core controller 147, and or provide the UE 101 with access to the Internet 151.

The core cloud 145 includes the core network 146, which is an interconnected group of routers, switches, firewalls, and other network equipment that connects downstream components to the Internet 151. The core cloud 145 also includes one or more user plane functions (UPFs) 141. A UPF 141 is function operating in the data plane that manages routing and forwarding of UE 101 traffic to the network 100. The UPF 141 may perform similar functions to a SGW in a 4G network. However, the UPF 141 is virtualized and may be decoupled from policy enforcement and may operate as a virtual machine/function allocated over multiple physical devices. Specifically, the UPF 141 may receive uplink packets from the UE 101 and route such packets over the Internet 151 via the core network 146. Further, the UPF 141 may receive downlink packets from the Internet 151 via the core network 146. The UPF 141 may then route such downlink packets to the appropriate UE 101 at the appropriate gNB 111. While the UPF 141 is depicted as residing in the core cloud 145, it should be noted that the virtualized nature of the UPF 141 also allows the UPF 141 to be implemented in whole or in part in the access network (e.g., the multi-access service center 122) and/or the aggregation network (e.g., in the aggregation ring 135 and/or core ring 137).

The Internet 151 couples the core cloud 145 to many enterprise clouds 152. An enterprise cloud 152 is a cloud network comprising routers, servers, switches, etc. organized according to cloud networking principles. An enterprise cloud 152 may include various virtual machines or other servers configured to host services that respond to requests for data from the UE 101. For purposes of discussion, a node that communicates with a UE 101 may be referred to as a correspondent node. A correspondent node for the UE 101 may reside in an enterprise cloud 152 as a virtual machine, a dedicated server, etc. In some cases, a correspondent node may also be a different UE 101 connected to a different access network, for example via a gNB 111.

Figure 2A:
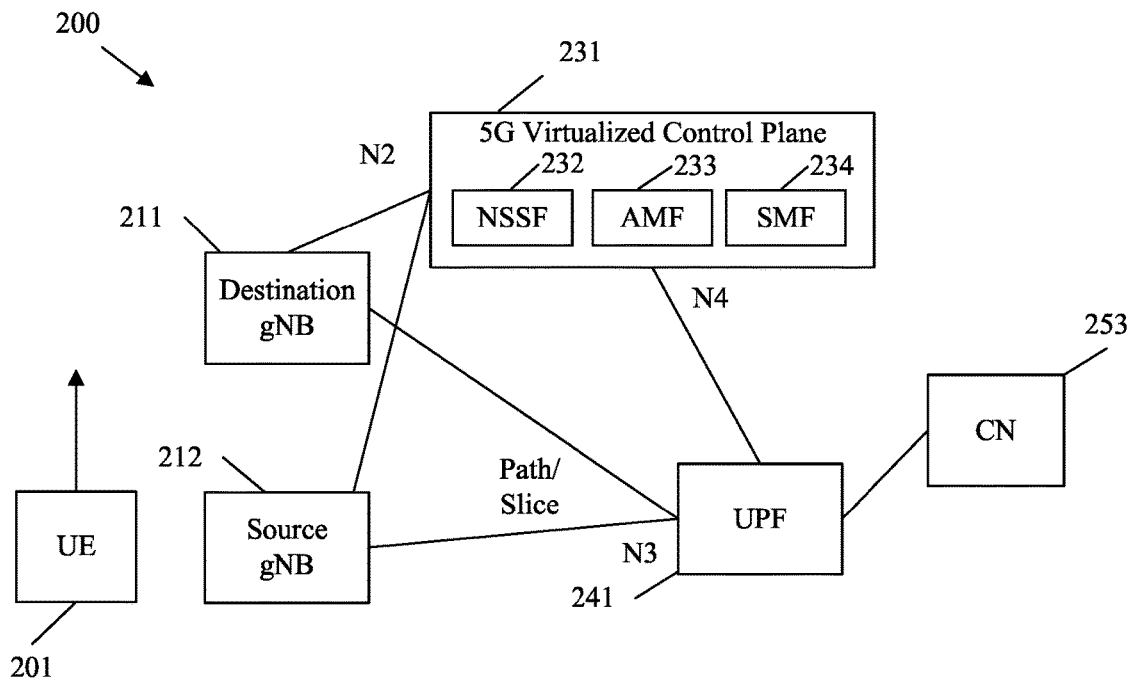
FIGS. 2A-2C are schematic diagrams that illustrate an example data plane based mechanism for routing packets in a network during a handover without employing network tunnels.
Figure 2B:
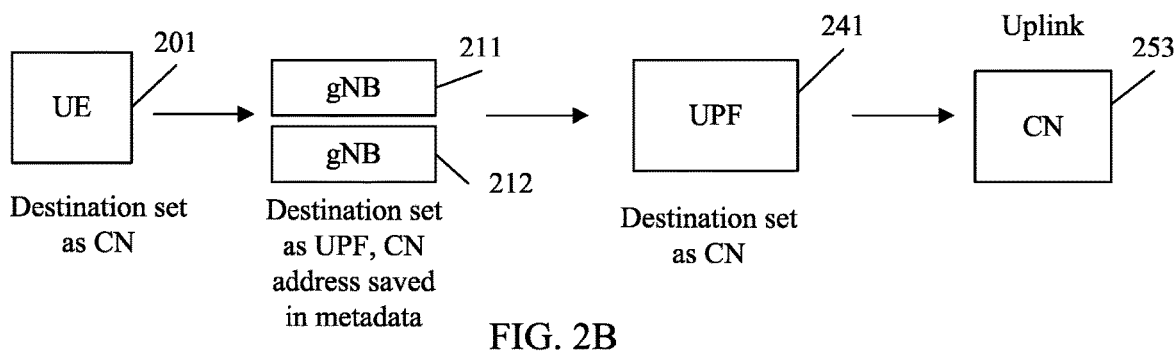
Figure 2C:
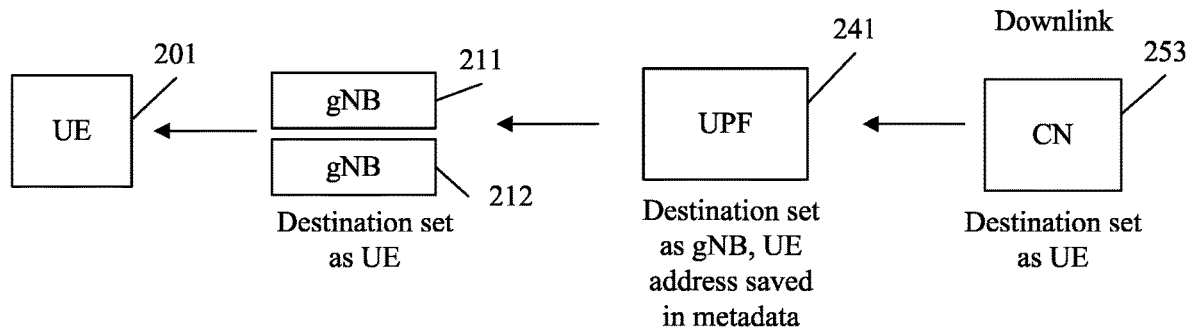

FIGS. 2A-2C are schematic diagrams that illustrate an example data plane based mechanism for routing packets in a network 200 during a handover without employing network tunnels. Referring to FIG. 2A, network 200 is an example implementation of network 100. Network 200 includes a UE 201, a UPF 241, and a 5G virtualized control plane 231 with a NSSF 232, an AMF 233, and an SMF 234, which may be substantially similar to UE 101, UPF 141, 5G virtualized control plane 131, NSSF 132, AMF 133, and SMF 134, respectively. The UE 201 communicates with network 200 via a source gNB 212 and a destination gNB 211, which may be substantially similar to gNB 111. Further, the UE 201 communicates with a correspondent node (CN) 253, which may be another UE, a server in a cloud (e.g., enterprise cloud 152), or other computing device capable of communicating data over the Internet.

The devices of network 200 communicate over various interfaces that are defined according to 3GPP standards. The interface between the source gNB 212/destination gNB 211 and the AMF 233 is denoted as interface N2. The interface between the SMF 234 and the UPF 241 is denoted as interface N4. The interface between the source gNB 212/destination gNB 211 and the UPF 241 is denoted as interface N3. Interface N3 traverses a network path and/or network slice across the access network, the aggregation network, and/or the core network or portions thereof.

As shown in FIG. 2A, the UE 201 is moving from a position in proximity to the source gNB 212 to a position in proximity to the destination gNB 211. Accordingly, the UE 201 should undergo a handover to shift communications between the source gNB 212 and the destination gNB 211. In a 4G paradigm, various network tunnels would be employed to manage communications between the UE 201 and the correspondent node 253 during the handover. Specifically, the UE 201 would initially communicate with a tunnel between the source gNB 212 and the UPF 241 over N3. During the handover, a temporary tunnel would be created between the source gNB 212 and the destination gNB 211 to manage communications until the handover is complete. Further, a tunnel between the destination gNB 211 and the UPF 241 over N3 would be created for the traffic after the handover. The temporary tunnel between the source gNB 212 and the destination gNB 211 as well as the original tunnel between the source gNB 212 and the UPF 241 would be closed once the handover is complete. Such tunnels would be created by the 5G virtualized control plane 231 over interfaces N2 and N4. As noted above, such tunnel creation and teardown employs a significant amount of signaling, which may become problematic for small 5G cells with many UEs 201 performing frequent handovers.

Accordingly, the disclosed mechanism routes packets without employing such tunnels, and hence omits the corresponding signaling overhead. FIG. 2B illustrates a data plane mechanism for performing routing between the UE 201 and the correspondent node 253 in the upstream direction without resorting to tunnels created by the 5G virtualized control plane 231. When performed consistently, the disclosed mechanism routes the packet even when a handover occurs. Specifically, the UE 201 sends an uplink packet to the current gNB, which can be either the source gNB 212 or destination gNB 211. The UE 201 sets a destination field in the uplink packet with the internet protocol (IP) address of the correspondent node 253. The current gNB 211 or 212 employs BPP. For example, the uplink packet can be sent by the UE 201 in BPP format or the current gNB 211 or 212 can convert the uplink packet to BPP format. BPP allows for larger packet encodings than other protocols. Specifically, BPP allows for conditions, executable commands, and metadata to be appended to a packet. In this case, the current gNB 211 or 212 determines the UPF 241 associated with the UE 201. This determination may be made locally based on memory and/or by consulting the 5G virtualized control plane 231. For example, the current gNB 211 or 212 can consult the attached multi-access service center, which can perform an address resolution with the 5G virtualized control plane 231 by employing the IP address and/or other identifiers (IDs) in the uplink packet. Once the correct UPF 241 is determined, the current gNB 211 or 212 moves the IP address of the CN 253 to the uplink packet's metadata. The current gNB 211 or 212 sets the destination IP address of the uplink packet as the IP address for the UPF 241. Further, the current gNB 211 or 212 includes a change address command in the uplink packet with a condition set to the IP address of the UPF 241. The current gNB 211 or 212 can also update a checksum as desired, for example when the next header is a transmission control protocol (TCP)/user datagram protocol (UDP) header. The correct UDP port range is selected based on quality of service class identifier (QCI). Further, the QCI may be employed by a policy based routing (PBR) function for selecting the correct path/slice across N3. The selected UDP port may be kept as metadata for increasing the entropy for load balancing. The path identifier (ID) may be maintained as part of a path instruction.

The change address command is ignored by any node unless the condition is met. Accordingly, the uplink packet is routed to the UPF 241 based on the destination IP address set in the uplink packet. Upon receiving the uplink packet, the UPF 241 checks the condition and determines that the condition is true because the UPF's 241 IP address matches the IP address of the condition. The UPF 241 then executes the change address command. The change address command directs the UPF 241 to obtain the correspondent node 253 IP address from metadata and place that IP address in the destination field of the uplink packet. The UPF 241 can then forward the uplink packet upstream, which results in the uplink packet being routed to the correspondent node 253 based on the IP address in the uplink packet destination field. As noted above, this data plane based procedure is agnostic to which gNB 211 or 212 the UE 201 is currently attached to. Whichever gNB 211 or 212 receives the uplink packet forwards the uplink packet to the correct UPF 241. As such, no tunnel is needed regardless of where the UE 201 is in the handover process between the source gNB 212 and the destination gNB 211.

FIG. 2C illustrates a data plane mechanism for performing routing between the UE 201 and the correspondent node 253 in the downstream direction without resorting to tunnels created by the 5G virtualized control plane 231. The downstream mechanism is substantially similar to the upstream mechanism, but applied in reverse. Further, when performed consistently, the disclosed mechanism routes the packet even when a handover occurs. Specifically, the correspondent node 253 sends a downlink packet to the UPF 241. The correspondent node 253 sets a destination field in the downlink packet with the IP address of the UE 201. The UPF 241 employs BPP. For example, the downlink packet can be sent by the correspondent node 253 in BPP format or the UPF 241 can convert the downlink packet to BPP format. The UPF 241 determines the current gNB 211 or 212 associated with the UE 201. This determination may be made locally based on memory and/or by consulting the 5G virtualized control plane 231. For example, the 5G virtualized control plane 231 can indicate to the UPF 241 when a handover occurs. In the absence of an indication of a handover, the UPF 241 can send to the last known gNB (e.g., the source gNB 212). Once a handover is initiated, the UPF 241 can send to the new gNB (e.g., the destination gNB 211). Once the correct gNB 211 or 212 is determined, the current UPF 241 moves the IP address of the UE 201 to the downlink packet's metadata. The UPF 241 sets the destination IP address of the downlink packet as the IP address for the current gNB 211 or 212. Further, the UPF 241 includes a change address command in the downlink packet with a condition set to the IP address of the current gNB 211 or 212. The change address command is ignored by any node unless the condition is met. Accordingly, the downlink packet is routed to the current gNB 211 or 212 based on the destination IP address set in the downlink packet. Upon receiving the downlink packet, the current gNB 211 or 212 checks the condition and determines that the condition is true because the current gNB's 211 or 212 IP address matches the IP address of the condition. The current gNB 211 or 212 then executes the change address command. The change address command directs the current gNB 211 or 212 to obtain the UE 201 IP address from metadata and place that IP address in the destination field of the downlink packet. The current gNB 211 or 212 can then forward the downlink packet downstream to the UE 201 based on the IP address in the downlink packet destination field. As noted above, this data plane based procedure is agnostic to which gNB 211 or 212 the UE 201 is currently attached to. The UPF 241 routes the downlink packet to whichever gNB 211 or 212 the UE 201 is currently attached to. As such, no tunnel is needed regardless of where the UE 201 is in the handover process between the source gNB 212 and the destination gNB 211.

The following are example commands to implement the data plane mechanism for performing routing as described in FIGS. 2A-2C:

```
Cmd:
    cond: eq (par.meta "node-id" (offset 0, len4), par.data "node-id");
    action: swap
        (par.meta "original-da" (offset 4, len 4), par.data
        "hdr-dest-address");
    action: session-lb
        (par.meta "load-balance tag" (offset 8 len 2));
    action: serialize-next strip-bpp;
    action: checksum-regenerate;
```

The data plane mechanism is described in terms of change address commands employed between a gNB 211 or 212 and a UPF 241. However, it should be noted that the same mechanism could apply between any two points in a network 200. For example, the same mechanisms could be applied between a UPF 241 and a cell site router (CSR) coupled to the gNB 211. As a further example, the same mechanism could apply between a UPF 241 and any radio access network element as specified in 3GGP standard TS23.501 which would otherwise perform general packet radio service (GPRS) tunneling protocol (GTP) encapsulation and/or decapsulation of a user packet.

Figure 3:
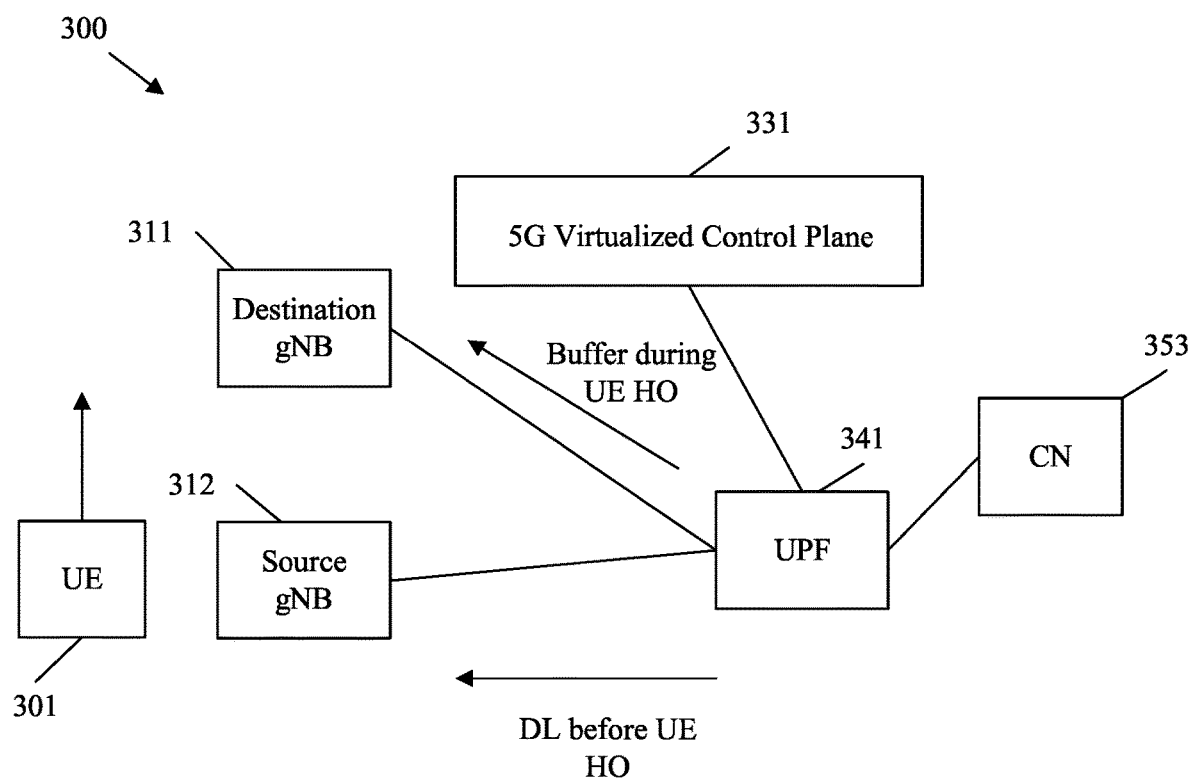
FIG. 3 is a schematic diagram that illustrates an example data plane based mechanism for buffering packets in a network during a handover.

FIG. 3 is a schematic diagram that illustrates an example data plane based mechanism for buffering packets in a network 300 during a handover. Network 300 is an example implementation of network 100 and/or 200. Network 300 includes a UE 301, a UPF 341, and a 5G virtualized control plane 331, which may be substantially similar to UE 101, UPF 141, and 5G virtualized control plane 131, respectively. The UE 301 communicates with network 300 via a source gNB 312 and a destination gNB 311, which may be substantially similar to gNB 111. Further, the UE 301 communicates with a correspondent node 353, which may be another UE, a server in a cloud (e.g., enterprise cloud 152), or other computing device capable of communicating data over the Internet. Network 300 may be implemented as an example of network 200. Specifically, the embodiments disclosed with respect to network 300 can be used alone or in combination with the embodiments of network 200.

When a UE 301 is handed over between a source gNB 312 and a destination gNB 311 some downlink packets may be lost unless such packets are buffered. For example, the UPF 341 may initially (before the handover) forward downlink packets toward the source gNB 312 for delivery to the UE 301. Upon receiving an indication of a handover, the UPF 341 may begin forwarding the downlink packets toward the destination gNB 311, for example by employing the mechanisms discussed with respect to network 200. If such downlink packets are not buffered until the handover is complete (e.g., during reconfiguration of the air interface at the UE 301), such unbuffered packets are dropped by the destination gNB 311 and lost. This scenario may be acceptable for certain applications where session continuity is managed above the transport layer (e.g., at the application layer) or if packet loss is not considered to be critical. However, this scenario may be unacceptable for certain types of applications, for example based on QCI requirements for a corresponding application. As specific examples, packet loss during handovers may be unacceptable for voice over long term evolution (VoLTE) based traffic or other traffic where extreme network reliability is expected. In 4G, control plane messages may be employed to manage such buffering. However, the present disclosure aims to reduce such signaling overhead during handover.

Accordingly, the UPF 341 can be configured to manage buffering in the data plane by employing conditional commands in BPP. For example, the UPF 341 can insert a buffering start command into the next downlink packet after receiving an indication from the 5G virtualized control plane 331 that a handover has been initiated for the UE 301. Such handover indication can include a different path identifier in the downlink packet, a different IP address in the destination address indicating the destination gNB 311 instead of the source gNB 312 as discussed in network 200, etc. A condition can also be set as the IP address of the current gNB, in this case the destination gNB 311. This ensures the buffering start command is executed at the destination gNB 311 and not at other intervening nodes. Upon receiving a downlink packet with buffering start, the destination gNB 311 confirms the condition and buffers the corresponding packet.

Between the initial handover indication and an indication that the handover is complete, the UPF 341 may insert a keep buffering command into each downlink packet along with a corresponding condition set as the destination gNB 311. This may be done because the destination gNB 311 executes each command for each downlink packet individually, and may be unable to perform such buffering without an explicit instruction. The UPF 341 may also insert an increasing sequence number in the metadata for each downlink packet (e.g., including in the packet that includes the buffering start command). The sequence number allows the destination gNB 311 to buffer the packets in order so that such packets can be sent to the UE 301 in order once the handover is complete.

Once the UPF 341 receives an indication that the handover is complete, the UPF 341 can insert a release buffer command into the next downlink packet along with a condition set as the destination gNB 311. Upon receiving the downlink packet with the release buffer command, the destination gNB 311 can check the condition and release the buffered downlink packets for transmission to the UE 301 in order based on the sequence numbers. The downlink packet with the release buffer command need not be buffered as the downlink packet with the release buffer command may not contain a buffer command. However, in some examples, the downlink packet with the release buffer command also contains a sequence number, and hence the destination gNB 311 may buffer such packet temporarily in order to send such downlink packet in a first in first out order with respect to the previously buffered packets. In this way, buffering at the destination gNB 311 is managed in the data plane by employing messages that are already traversing the network 300, which omits the overhead associated with control plane messages to explicitly manage buffering at the destination gNB 311.

The following are example commands to implement the data plane mechanism for performing routing as described in FIG. 3:

```
Cmd: --buffer-start
    cond: eq (par.meta ("pkt-dst-ip"), par.data "node-id");
    action: start-buffer-packet ;
    metadata: 4-byte-sequence-number
Cmd: --continue-buffering;
    cond: eq (par.meta ("pkt-dst-ip"), par.data "node-id");
    action: continue-buffering;
    metadata: 4-byte-sequence-number
Cmd: --release-buffer;
    cond: eq (par.meta ("pkt-dst-ip"), par.data "node-id");
    action: release-buffer;
    metadata: 4-byte-sequence-number
```

It should be noted that different packets contain different commands depending on the dynamic context and that the commands above are generally not included in the same packet.

The data plane mechanism is described in terms of change address commands employed between a gNB 311 or 312 and a UPF 341. However, it should be noted that the same mechanism could apply between any two points in a network 300. For example, the same mechanisms could be applied between a UPF 341 and a CSR coupled to the gNB 311. As a further example, the same mechanism could apply between a UPF 341 and any radio access network element as specified in TS23.501 which would otherwise perform GTP encapsulation and/or decapsulation of a user packet.

Figure 4:
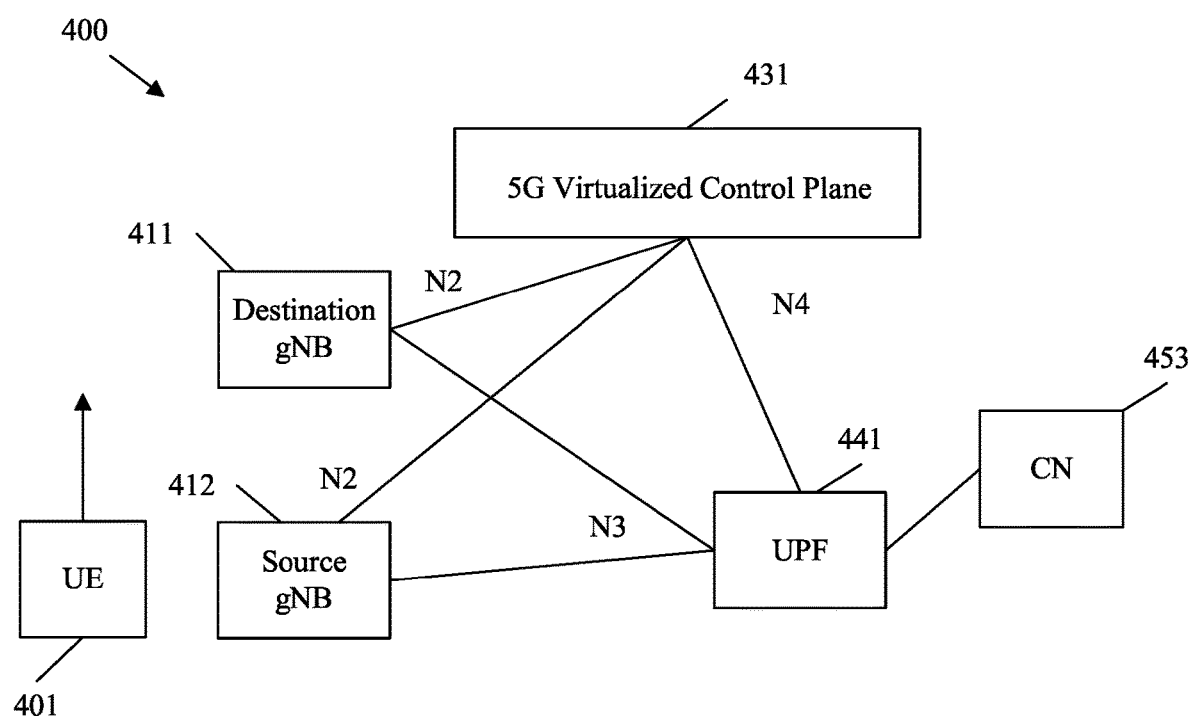
FIG. 4 is a schematic diagram that illustrates an example contrast between conditional command based handover signaling and 4G handover signaling in a network.

FIG. 4 is a schematic diagram that illustrates an example contrast between conditional command based handover signaling and 4G handover signaling in a network 400. Network 400 includes the embodiments of networks 200 and 300 as implemented on the components described in network 100. Specifically, the network 400 includes a UE 401, a UPF 441, and a 5G virtualized control plane 431, which may be substantially similar to UE 101, UPF 141, and 5G virtualized control plane 131, respectively. The UE 401 communicates with network 400 via a source gNB 412 and a destination gNB 411, which may be substantially similar to gNB 111. Further, the UE 401 communicates with a correspondent node 453, which may be another UE, a server in a cloud (e.g., enterprise cloud 152), or other computing device capable of communicating data over the Internet.

A UE 401 handover may include a decision and request phase, a preparation phase, a path switch phase, and a complete phase. The decision and request phase is initiated after a UE 401 performs RRC measurements, which are reported to the source gNB 412 and results in a determination that a handover should occur from the source gNB 412 to a destination gNB 411 with better signal characteristics. During the decision and request phase, the source gNB 412 sends a handover request to the 5G virtualized control plane 431. Further, the 5G virtualized control plane 431 acknowledges the handover request from the source gNB 412. Unlike in the 4G implementation, the disclosed embodiments allow the 5G virtualized control plane 431 to omit messaging to create tunnels between the UPF 441 and the destination gNB 411 and between the source gNB 412 and the destination gNB 411. The decision and request phase may also include adding the IP address of the destination gNB 411 to packet metadata associated with mobility IDs and/or ephemeral IDs.

During the preparation phase, the source gNB 412 sends a RRC reconfiguration request to the UE 401 to cause the UE 401 to update radio parameters. The UE 401 reconfigures the destination gNB 411 by updating a transfer status and performing radio connection procedures to connect to the destination gNB 411. The source gNB 412 shares sequence numbers related to communication packets with the destination gNB 411. At this point, the UE 401 continues to send uplink data via the source gNB 412, while downlink data is forwarded from the UPF 441 to the destination gNB 411 and buffered. The mobility services in the 5G virtualized control plane 431 may also send a push notification to the UPF 441 with data relating to the destination gNB 411, which may initiate BPP based buffering based on QCI.

During the path switch phase, the buffered data is released from the destination gNB 411 to the UE 401 via BPP signaling. The path switch procedure between the UE 401 and the destination gNB 411 is completed. The modify bearer procedure is completed between the 5G virtualized control plane 431 and the UPF 441 to update bearer identifiers. At this point, the uplink data is forwarded from UE 401 to the source gNB 412 to the UPF 441. Meanwhile, the downlink data is forwarded from the UPF 441 to the destination gNB 411 then forwarded on to the UE 401.

During the complete phase, the uplink path is switched so that the uplink packets are sent from the UE 401 to the destination gNB 411 and to the UPF 441. At this stage, both the uplink and downlink traffic traverse the destination gNB 411 and no longer traverse the source gNB 412. Further, a path switch acknowledgement is sent from the UPF 441 to the 5G virtualized control plane 431. The 5G virtualized control plane 431 can omit control plane signaling related to releasing tunnels between the source gNB 412 and the UPF 441 and between the source gNB 412 and the destination gNB 411. As shown by the preceding discussion, handovers in 5G using the disclosed data plane signaling mechanisms are simplified by omitting explict control signaling for buffering and tunnel management.

Figure 5:
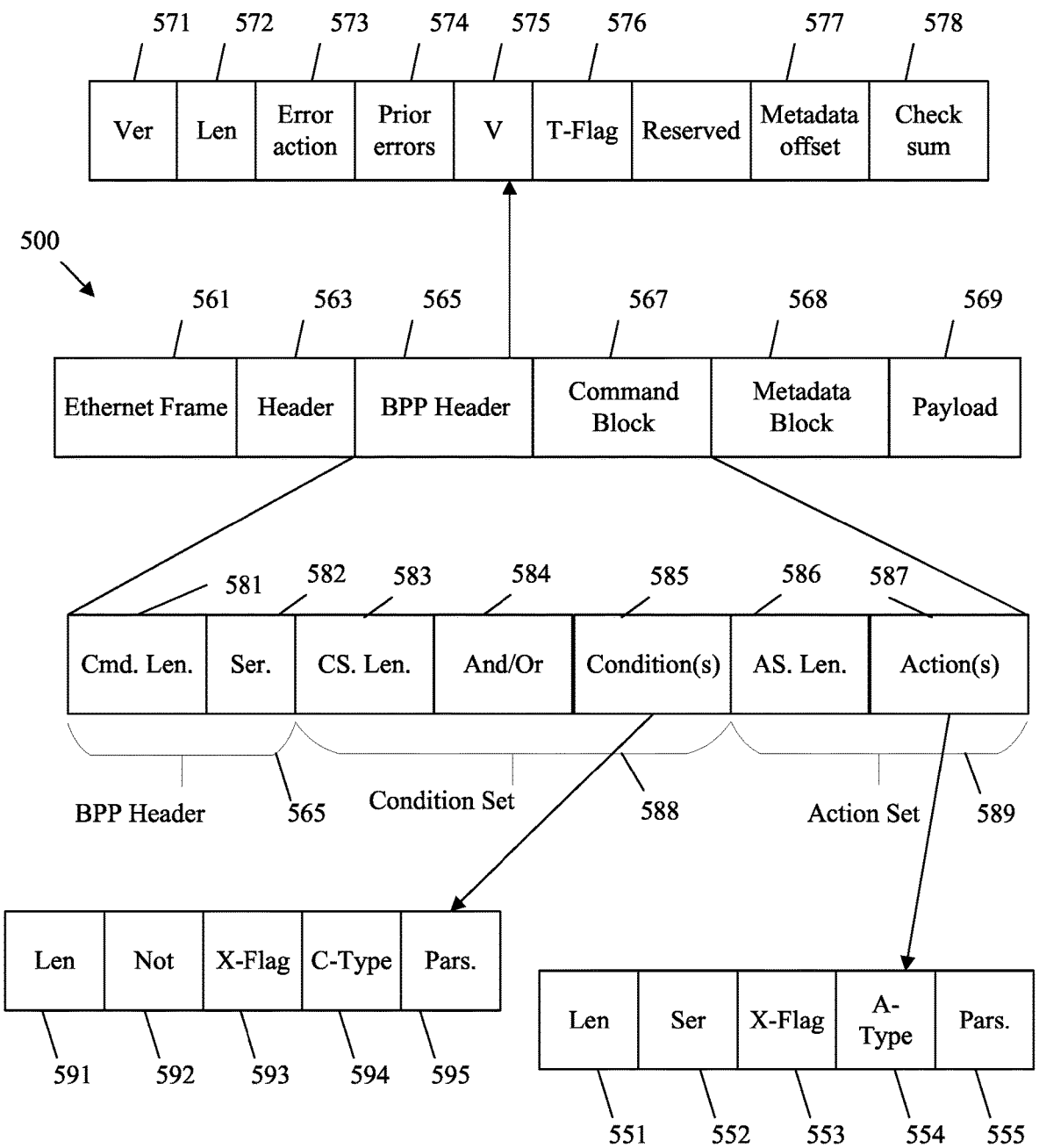
FIG. 5 is a schematic diagram of an example big packet protocol (BPP) encoding that can be used to support data plane handover signaling.

FIG. 5 is a schematic diagram of an example BPP encoding 500 that can be used to support data plane handover signaling, such as in network 100, 200, 300, and/or 400. For example, a packet encoded according to BPP encoding 500 can carry conditional statements to manage packet routing and/or buffering as discussed above. Specifically, the BPP encoding 500 can include a change destination address command, a buffering start command, a keep buffering command, and/or a buffer release command with corresponding conditions and metadata.

In an example, an uplink packet received at a gNB and/or a downlink packet received at a UPF may include an Ethernet frame 561, a header 563, and a payload 569. The Ethernet frame 561 contains layer two source and destination data for the packet, such as media access control (MAC) addresses for the source and destination. The header 563 contains address and other header information for the packet, such as IP version four (IPv4) and/or version six (IPv6), transport layer headers, etc. The payload 569 is the data communicated from the source to the destination (e.g., the UE to the correspondent node or vice versa). The gNB or the UPF (in the upstream direction and downstream direction, respectively) can receive a communications packet and add additional fields to convert the received communications packet into a packet formatted according to the BPP encoding 500.

Specifically, the packet comprises the Ethernet frame 561, the header 563, the payload 569, a BPP header 565, a command block 567, and/or a metadata block 568. The gNB and/or the UPF may add the BPP header 565, the command block 567, and the metadata block 568 to cause the desired routing and/or buffering functionality as described above. The BPP header 565 indicates that the packet is a BPP packet and includes error data and offset data. The command block 567 which may contain one or more commands, such as change address and/or buffering commands, along with one or more conditions that should be satisfied in order to initiate the commands, which creates a conditional command. The metadata block 568 contains any data relevant to the conditional commands, for example the actual destination address for a change address command. Hence, the BPP header 565, command block 567, and/or metadata block 568 can be inserted into a packet for processing at a node specified by the relevant condition(s).

In an example, the BPP header 565 can include a command length field 581 that indicates the length of the BPP based commands. The BPP header 565 can also include a serial number field 582 that contains a serial number that uniquely identifies the corresponding command. As a specific example, the BPP header 565 can include a version field 571, a length field 572, an error action field 573, a prior errors field 574, a V flag 575, a T flag 576, a metadata offset 577, and a checksum 578. The version field 571 contains data regarding the version of BPP employed by the packet. The length field 572 indicates the length of the BPP header 565, for example sixteen octets, thirty two octets, one hundred twenty eight octets, a multiple of thirty two octets, etc. The error action field 573 contains an action to be taken upon encountering an error, and can include drop packet, ignore error, note error and carry on, etc. The prior errors field 574 can store any errors that occur along the path of the packet. The V flag 575 and the T flag 576 can contain error verbosity and a time constraint, respectively. The metadata offset 577 contains an offset that indicates the start of the metadata block 568. The checksum 578 contains a checksum value that can be employed to check for errors in the packet (e.g., due to transposed bits).

The command block 567 can contain a condition set 588, which contains the one or more conditions used as part of the conditional command. For example, the condition set 588 in the command block 567 can include a condition set length field 583 that indicates the length of the condition set 588. The condition set 588 can also include a conditions field 585 that includes the one or more conditions that should be satisfied in order to execute the corresponding commands in an action set 589. The condition set 588 can also include an and/or field 584 to indicate whether the conditions in the conditions field 585 are interpreted according to a logical and or a logical or. Specifically, a logical and indicates that all of the conditions in the conditions field 585 should be satisfied to initiate the action set 589, while a logical or indicates that any one of the conditions in the condition field 585 can be satisfied to initiate the action set 589.

The command block 567 can also contain the action set 589. The action set 589 can include an action set length field 586, which indicates a length of the action set 589. The action set 589 also includes one or more action fields 587, which contain the commands to be executed upon the occurrence of the condition(s) in the condition set 588.

The conditions in the conditions field 585 can be selected from a predefined conditions catalog. Such conditions may include unconditional true, presence or absence of a state, a match or other comparison of parameter values, a packet intrinsic value (e.g., metadata value, header field value, packet length, etc.), a flow intrinsic value (e.g., statelet data, inter-packet delay, etc.), and/or a node intrinsic value such as a node address, an interface utilization, etc. Such conditions can rely on parameters, such as items in the conditions field 585, items in the metadata block 568 and/or statelet data stored at the node handling the packet. The conditions field 585 can contain one or more conditions. As a specific example, each condition in the conditions field 585 can include a length field 591 indicating the length of the condition in bits, a not field 592 which may indicate a default Boolean condition, an X-flag field 593 which may contain an extension flag, a C-type field 594 to indicate the condition to be employed, and one or more parameters 595 to further describe the conditions.

The actions in the actions field 587 can be selected from a predefined conditions catalog. Such conditions may include an action to be performed on a packet (e.g., packet drop, packet mark, packet buffer, select queue, etc.), an action to be performed on packet metadata (e.g., write/ modify/swap metadata, change address, etc.), an action to be performed on node state (e.g., create, read, modify, export, etc.), an action for be performed on packet flow (e.g., reorder), and/or an action on a device (e.g., reserve, retrieve, etc.). Such actions may be limited to prevent modification of the packet payload and/or programming of the handling node to prevent security issues. As a specific example, the actions in the actions field 587 may each contain an action set length field 551 to indicate the length of the action. The actions field 587 may further include a serial field 552 containing a serial number for the corresponding action. The actions field 587 may further include an X-flag field 553 which may contain an extension flag. The actions field 587 may also contain an action type field 554 indicating the command. The actions field 587 may also include one or more parameters 555 to describe the commands.

By employing the above encoding, actions such as a change destination address command, a buffering start command, a keep buffering command, and/or a buffer release command can be included in the actions field 587 to control the activity of a node along the path of a flow. Further, the commands can be directed to a specific node by placing an address of the node (e.g., the IP address) in the conditions field 585.

FIG. 6 is a schematic diagram of an example BPP header 600 encoding that can be used to support data plane handover signaling. Specifically, the BPP header 600 may be employed to implement a BPP header 565. The BPP header 600 may extend from bit position zero to bit position thirty one, and may be sixty four bits long. A version field, which is substantially similar to version field 571, extends from bit position zero to bit position two. A one bit extension flag is located at bit position three. A two bit error action flag is located at bit positions four and five. A one bit prior errors (e) flag is located at bit position six. An error verbosity flag is located at bit position seven. Such flags are substantially similar to an error action field 573, prior errors field 574, and V flag 575, respectively. A length field, which is substantially similar to length field 572, extends from bit position eight to bit position fifteen. A meta field, which is substantially similar to metadata offset 577, extends from bit position sixteen to bit position twenty two. An r flag is located at bit position twenty three. A next proto block extends from bit position twenty four to bit position thirty one. In the next octet, a time to live field extends between bit positions zero and seven. A to flag is located at bit positions eight and nine. A T flag, which is substantially similar to T flag 576 is located at bit positions ten through nineteen. Bit positions twenty through thirty one are reserved.

FIG. 7 is a schematic diagram of an example command header 700 encoding that can be used to support data plane handover signaling. Specifically, the command header 700 may be employed to implement a header in a command block 567. The command header 700 contains a length field that contains the length of the command in octets and extends between bit positions zero and four. The command header 700 contains a next flag that may be set to indicate the presence of a subsequent command after the current command at bit position five. The command header 700 contains a serialization flag at bit position five that may be set to indicate whether the next command depends on the current command being executed first. The command header 700 also contains a condition flag at bit position seven that may be set to indicate whether the command is conditional or unconditional.

Figure 8:
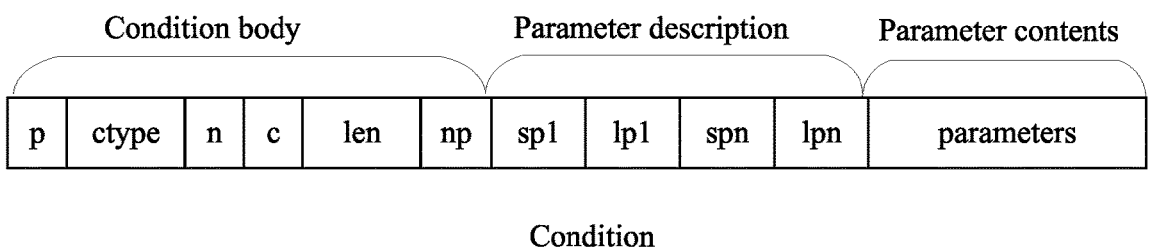
FIG. 8 is a schematic diagram of an example condition encoding that can be used to support data plane handover signaling.

FIG. 8 is a schematic diagram of an example condition 800 encoding that can be used to support data plane handover signaling. Specifically, the condition 800 may be employed to implement a condition in a condition set 588.

The condition 800 contains a condition body that extends from bit position zero to bit position fifteen. The condition body contains a proprietary flag at position zero, a c-type flag located from position one to position six, an n flag at position seven, a c flag from positions eight through nine, a condition length from positions ten through thirteen, and a np flag at bits positions fourteen through fifteen. The proprietary flag indicates whether the condition 800 is proprietary of part of a built in set. The c type flag and condition length are substantially similar to C-type flag 594 and a length field 591, respectively. The n flag indicates whether there is a subsequent condition. The condition 800 may further include a parameter description for parameters one to n. Each parameter has a sp descriptor and an 1p descriptor of two bits each. The condition 800 further concludes the parameters in the parameter contents.

Figure 9:
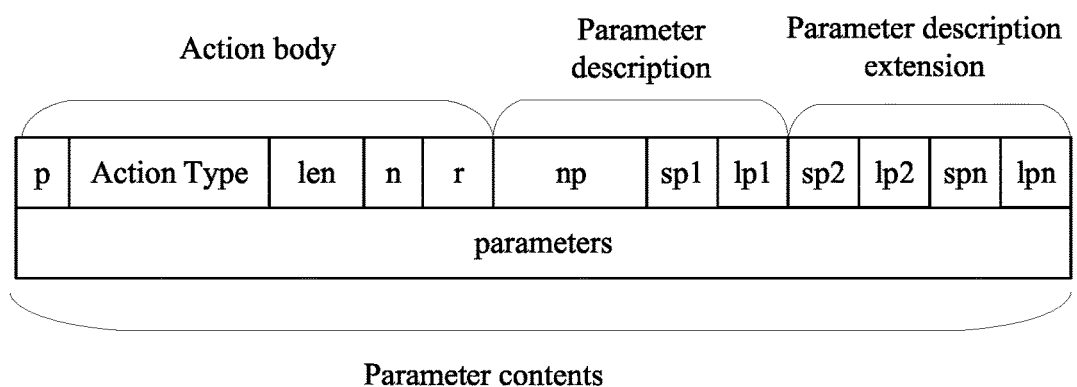
FIG. 9 is a schematic diagram of an example action encoding that can be used to support data plane handover signaling.

FIG. 9 is a schematic diagram of an example action 900 encoding that can be used to support data plane handover signaling. Specifically, the action 900 may be employed to implement an action in an actions field 587. The action 900 contains an action body that extends from bit position zero to bit position fifteen. The action body contains a proprietary flag at position zero, an action type located from position one to position seven, an action length from positions eight through twelve, an n flag at positions thirteen and fourteen, and an r flag at bit position fifteen. The proprietary flag indicates whether the condition is proprietary or part of a built in set. The action type and action length are substantially similar to action type field 554 and length field 591, respectively. The n flag indicates whether there is a subsequent condition. The parameter description and parameter description extension are substantially similar to the parameter description of condition 800 but such parameters apply to the action 900 instead of the condition. Parameters may also be attached to the action 900.

Figure 10:
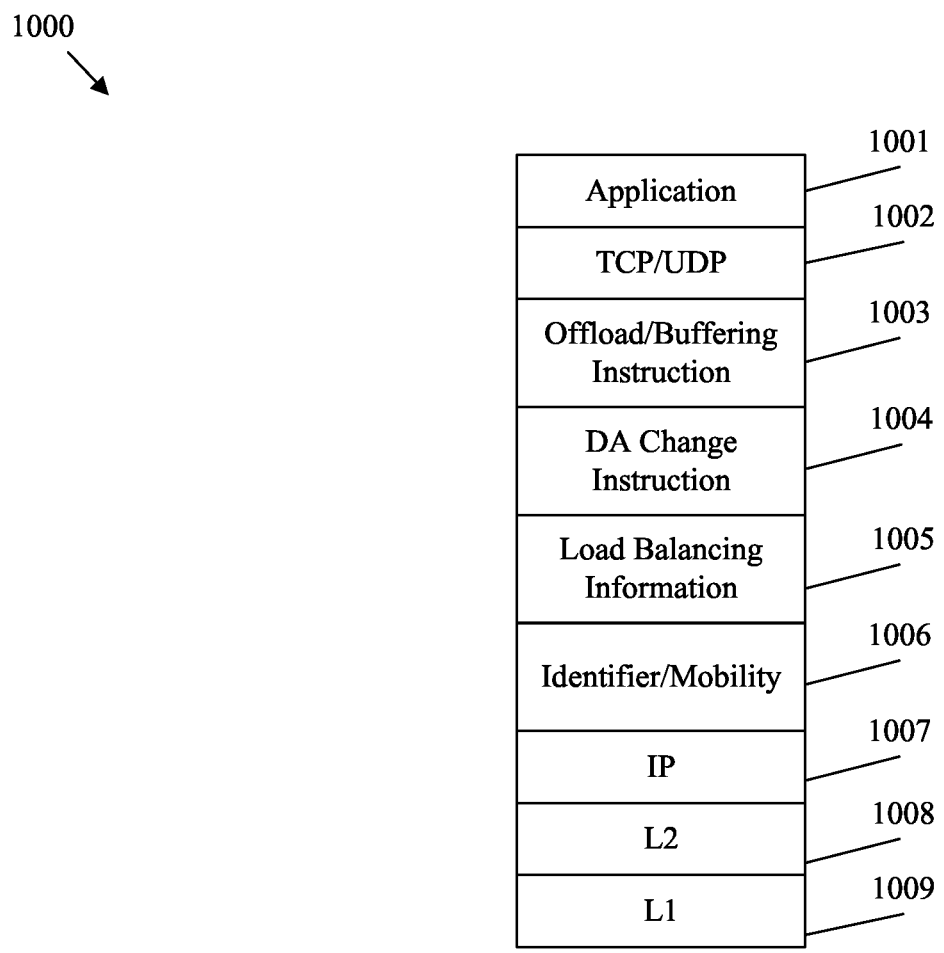
FIG. 10 is a schematic diagram of an example packet encoding that can be used to support data plane handover signaling.

FIG. 10 is a schematic diagram of an example packet 1000 encoding that can be used to support data plane handover signaling, such as in network 100, 200, 300, and/or 400. For example, a packet 1000 encoded according to BPP encoding 500 can carry conditional statements to manage packet routing and/or buffering as discussed above. Specifically, the BPP encoding 500 can include a change destination address command, a buffering start command, a keep buffering command, and/or a buffer release command with corresponding conditions and metadata. The packet 1000 includes open systems interconnection (OSI) model layer one (L1) data 1009 and layer two (L2) data 1008. The packet 1000 also includes IP addresses 1007 (layer three information), TCP/UDP information 1002 (layer four information), and application layer information 1001 (e.g., the payload/layer seven). In order to implement the scheme described herein mobility/identifier information 1006, load balancing information 1005, destination address change instructions 1004, and/or instructions to offload and/or manage buffering 1003 are included in packet 1000. As shown, the described information is positioned with the OSI layer three information and below the OSI layer four information as such instructions involve point to point routing.

Figure 11:
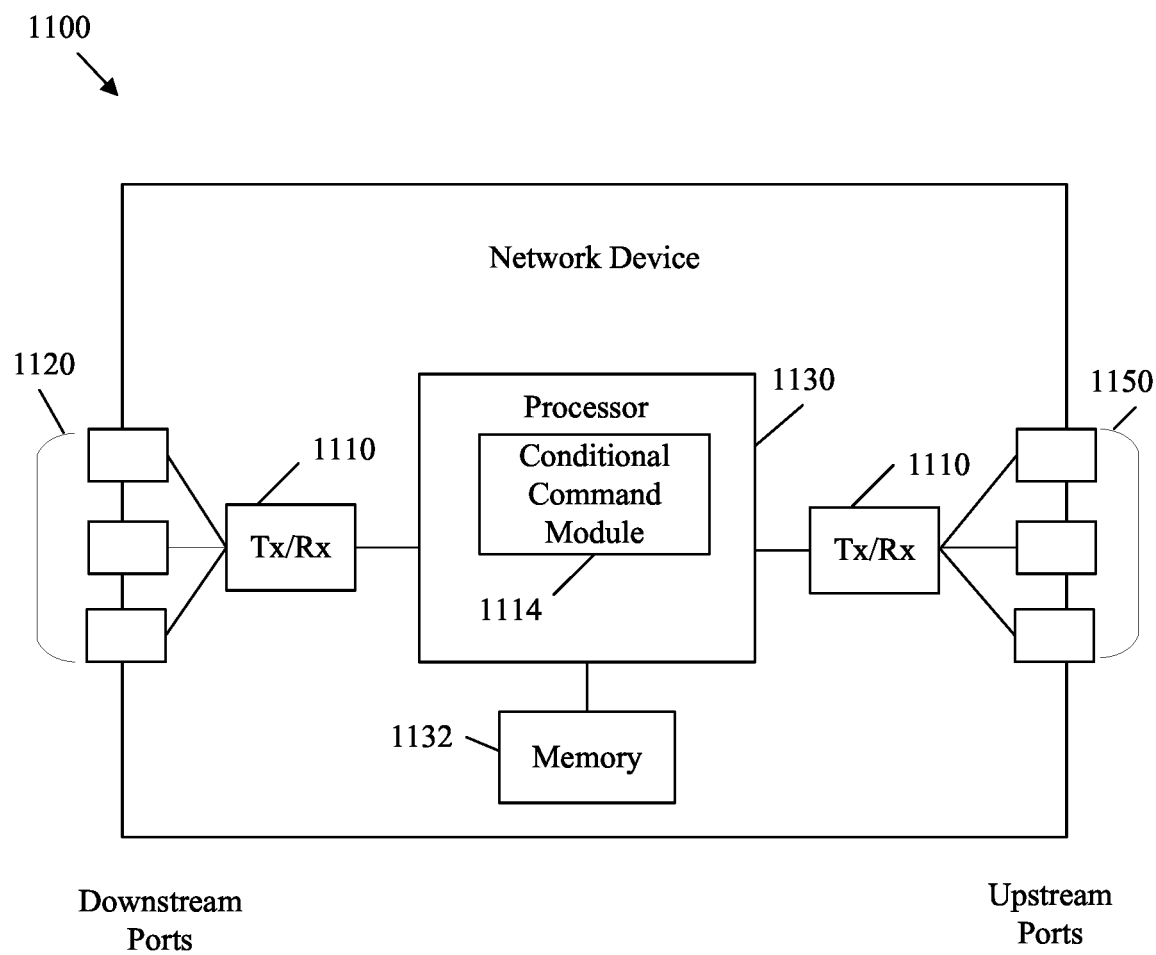
FIG. 11 is a schematic diagram of an example network device for data plane handover signaling.

FIG. 11 is a schematic diagram of an example network device 1100 for data plane handover signaling, such as in networks 100, 200, 300, and/or 400. Specifically, the network device 1100 may act as a gNB and/or a UPF. Further, the network device 1100 may control network routing and buffering via control plane messaging by employing conditional commands including change destination address, buffering start, keep buffering, and/or buffer release commands. Also, network device 1100 can be employed to implement methods 1200, 1300, and/or 1400 as discussed below as well as other methods/mechanisms disclosed herein.

Accordingly, the network device 1100 may be configured to implement or support the schemes/features/methods described herein. For instance, the features/methods in the disclosure may be implemented using hardware, firmware, and/or software installed to run on hardware. One skilled in the art will recognize that the term network device encompasses a broad range of devices of which network device 1100 is merely an example. Network device 1100 is included for purposes of clarity of discussion, but is in no way meant to limit the application of the present disclosure to a particular network device embodiment or class of network device embodiments.

The network device 1100 may be a device that communicates electrical and/or optical signals through a network, e.g., a switch, router, bridge, gateway, etc. In some cases, the network device 1100 may act alone, or in concert with other network devices 1100 to operate a virtual network device with the functionality described herein. As shown in FIG. 11, the network device 1100 may comprise transceivers (Tx/Rx) 1110, which may be transmitters, receivers, or combinations thereof. A Tx/Rx 1110 may be coupled to a plurality of downstream ports 1120 (e.g., downstream interfaces) for transmitting and/or receiving frames from other nodes and a Tx/Rx 1110 coupled to a plurality of upstream ports 1150 (e.g., upstream interfaces) for transmitting and/or receiving frames from other nodes, respectively. A processor 1130 may be coupled to the Tx/Rxs 1110 to process the data signals and/or determine which nodes to send data signals to. The processor 1130 may comprise one or more multi-core processors and/or memory devices 1132, which may function as data stores, buffers, etc. Processor 1130 may be implemented as a general processor or may be part of one or more application specific integrated circuits (ASICs) and/or digital signal processors (DSPs). The network device 1100 may comprise a conditional command module 1114, which may be configured to insert and/or execute conditional commands including change destination address, buffering start, keep buffering, and/or buffer release commands as discussed above. The conditional command module 1114 may be implemented in a general purpose processor, a field programmable gate array (FPGA), an ASIC, a DSP, a microcontroller, etc. In alternative embodiments, the conditional command module 1114 may be implemented in processor 1130 as computer executable instructions stored in memory device 1132 (e.g., as a computer program product stored in a non-transitory computer readable medium), which may be executed by processor 1130, and/or implemented in part in the processor 1130 and in part in the memory device 1132. The downstream ports 1120 and/or upstream ports 1150 may contain wireless, electrical, and/or optical transmitting and/or receiving components, depending on the embodiment.

Figure 12:
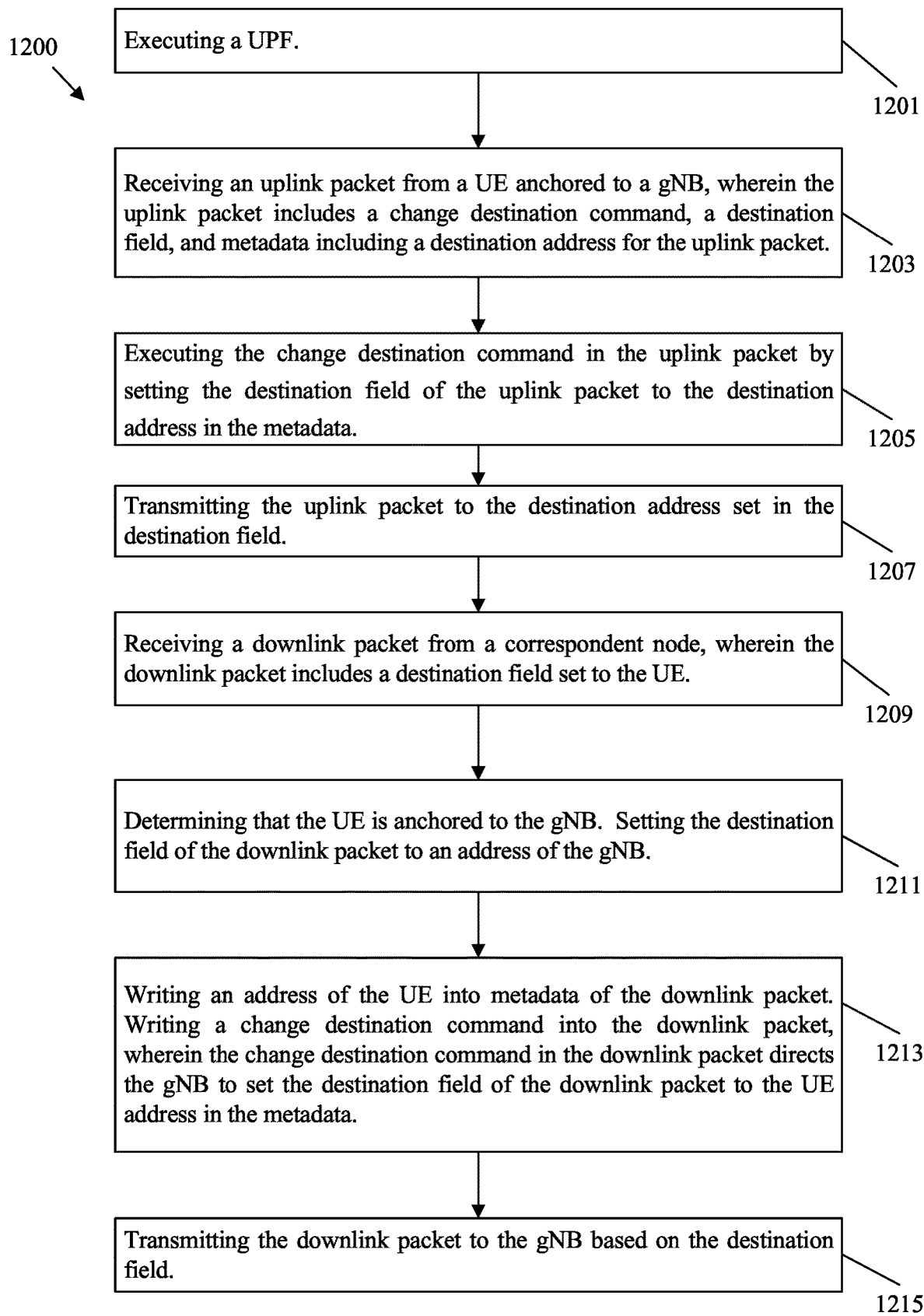
FIG. 12 is a flowchart of an example method for performing packet routing at a network element (NE) operating a UPF.

FIG. 12 is a flowchart of an example method 1200 for performing packet routing at a NE operating a UPF, such as UPF 141, 241, 341, and/or 441. Specifically, method 1200 may be employed to route packets to and from a gNB, from the perspective the UPF, without using network tunnels and regardless of UE handovers. As noted above, the UPF may be virtualized across one or more NEs. Accordingly, the NE executes the UPF at block 1201. At block 1203, the NE receives an uplink packet from a UE on a downstream interface. The UE is anchored to a gNB. The received uplink packet includes a change destination command, a destination field, and metadata including a destination address for the uplink packet. The change destination command is a conditional command that is set to initiate a change destination command only at the NE. For example, the change destination command can include a condition set to include a network address associated with the UPF, and the NE/UPF may execute the change destination command upon determining the network address in the condition matches at least one local address associated with the NE and/or the UPF. Prior to execution of the change destination command, the destination field of the uplink packet may be set to an address of the UPF. At block 1205, the NE executes the change destination command in the uplink packet by setting the destination field of the uplink packet to the destination address in the metadata. At block 1207, the NE transmits the uplink packet on an upstream interface to the destination address set in the destination field.

At block 1209, the NE/UPF may receive a downlink packet on the upstream interface. The downlink packet may be from a correspondent node. The downlink packet includes a destination field set to the UE. At block 1211, the NE/UPF determines that the UE is anchored to the gNB. Accordingly, the NE/UPF sets the destination field of the downlink packet to an address of the gNB. At block 1213, the NE/UPF writes an address of the UE into metadata of the downlink packet. Further, the NE/UPF writes a change destination command into the downlink packet. The change destination command in the downlink packet directs the gNB to set the destination field of the downlink packet to the UE address in the metadata. At block 1215, the NE/UPF can transmit the downlink packet to the gNB over a downstream interface based on the destination field. By employing method 1200, the uplink packet and the downlink packet may be communicated between the UPF and the gNB without traversing a network tunnel.

Figure 13:
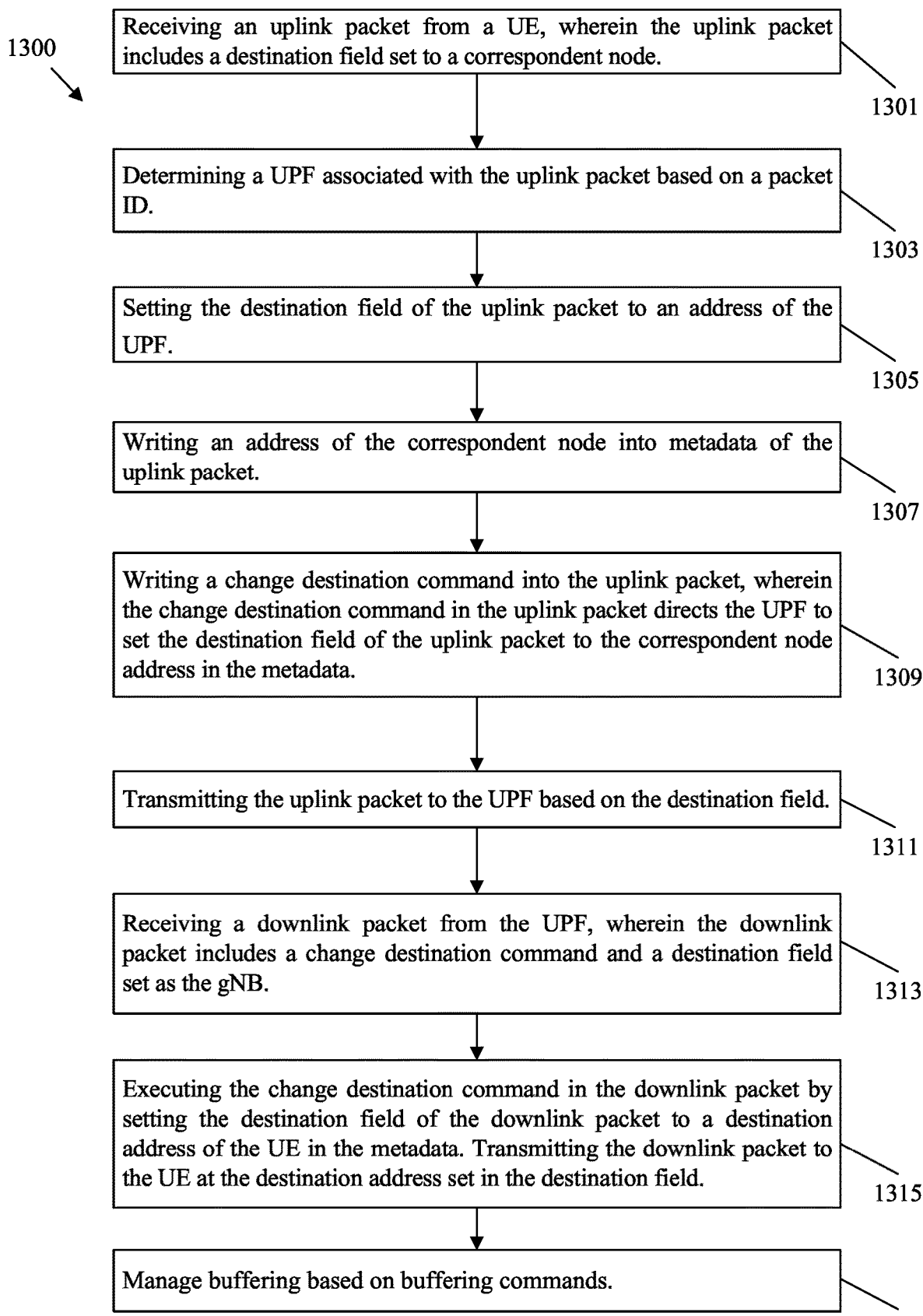
FIG. 13 is a flowchart of an example method for performing packet routing at a 5G base station (gNB).

FIG. 13 is a flowchart of an example method 1300 for performing packet routing at a gNB, such as gNB 111, source gNB 212, 312, and/or 412, and/or destination gNB 211, 311, and/or 411. Specifically, method 1300 may be employed to route packets to and from a UPF, from the perspective the gNB, without using network tunnels and regardless of UE handovers. At block 1301, the gNB receives an uplink packet from a UE on a downstream interface. The uplink packet as received includes a destination field set to a correspondent node. At block 1303, the gNB determines a UPF associated with the uplink packet based on a packet ID. At block 1305, the gNB sets the destination field of the uplink packet to an address of the UPF. At block 1307, the gNB writes an address of the correspondent node into metadata of the uplink packet. At block 1309, the gNB writes a change destination command into the uplink packet. The change destination command in the uplink packet directs the UPF to set the destination field of the uplink packet to the correspondent node address in the metadata. The change destination command is a conditional command set to initiate the change destination command only at a NE including a network address associated with the UPF. At block 1311, the gNB transmits the uplink packet to the UPF on an upstream interface based on the destination field.

At block 1313, the gNB receives a downlink packet from the UPF on the upstream interface. The downlink packet includes a change destination command and a destination field set as the gNB. At block 1315, the gNB executes the change destination command in the downlink packet by setting the destination field of the downlink packet to a destination address of the UE in the metadata. Specifically, the change destination command can be a conditional command with a condition set to an address of the gNB. Accordingly, the gNB can verify that the conditional address matches an address of the gNB and can then execute the command. At block 1315, the gNB may transmit the downlink packet over the downstream interface to the UE at the destination address set in the destination field. Hence, the uplink packet and the downlink packet may be communicated between the UPF and the gNB without traversing a network tunnel.

In the event a handover has occurred and/or in in process, the method 1300 may include an optional block 1317 for managing buffering commands. For example, the downlink packet may include a start buffering command. In this case, the gNB executes the start buffering command by obtaining a sequence number of the downlink packet from downlink packet metadata. The gNB can then store the downlink packet and the sequence number in a buffer of the gNB. As another example, the downlink packet may include a keep buffering command. In this case, the gNB executes the keep buffering command by obtaining a sequence number of the downlink packet from downlink packet metadata. The gNB can then store the downlink packet and the sequence number in a buffer of the gNB. In yet another example, the downlink packet can include a release buffer command. In this case, the gNB can execute the release buffer command by transmitting to the UE packets stored in the buffer over the downstream interface. Such packets can be transmitted based on the sequence numbers for the packets in order to preserve packet order in a first in first out scheme.

Figure 14:
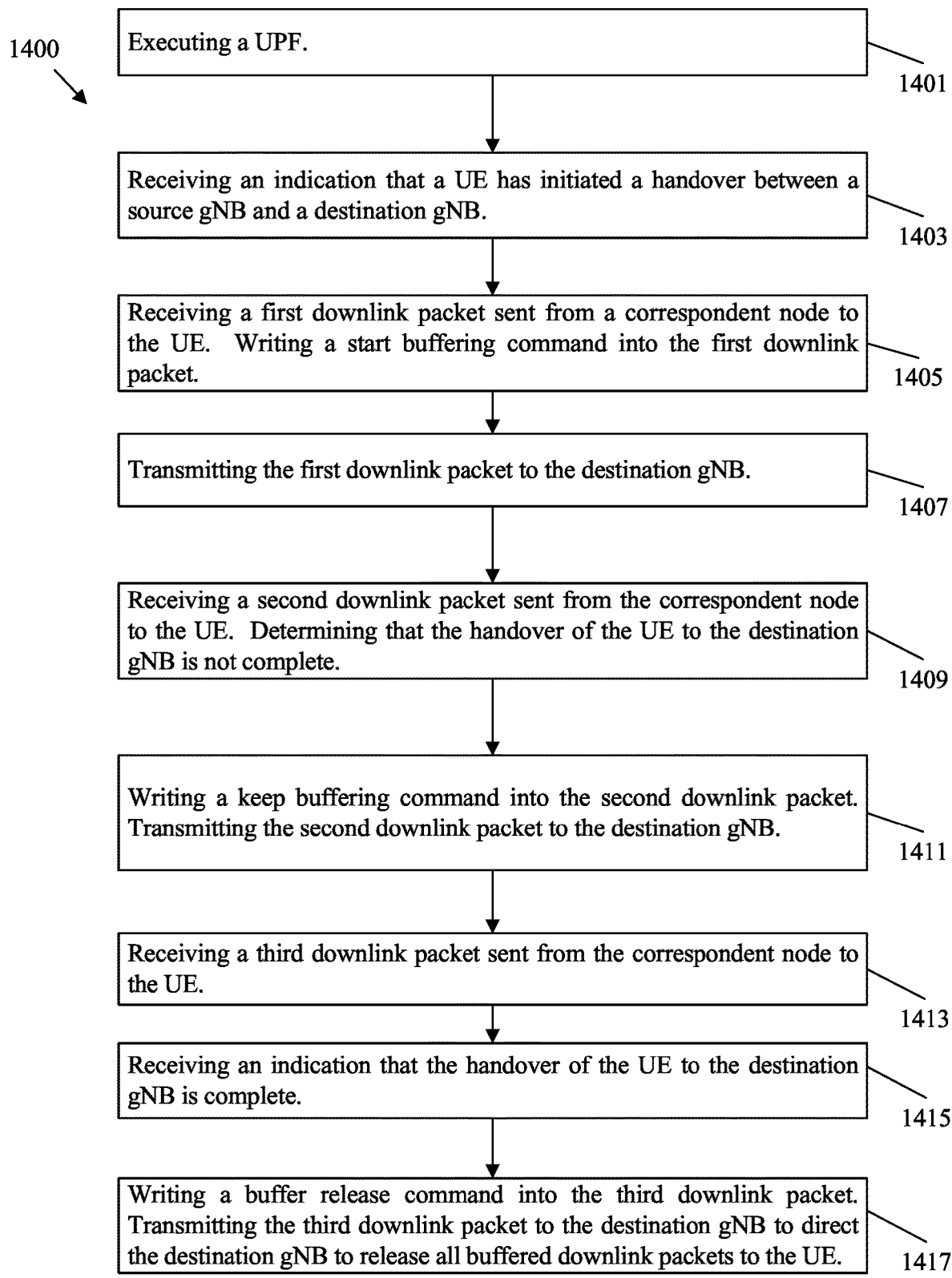
FIG. 14 is a flowchart of an example method for controlling packet buffering at a NE operating a UPF.

FIG. 14 is a flowchart of an example method 1400 for controlling packet buffering at a NE operating a UPF, such as UPF 141, 241, 341, and/or 441. Specifically, method 1400 may be employed by a UPF to control buffering at a destination gNB during a handover by using data plane bases signaling. Method 1400 may be used alone or in conjunction with method 1200. As noted above, the UPF may be virtualized across one or more NEs. Accordingly, the NE executes the UPF at block 1401. At block 1403, the NE/UPF receives an indication that a UE has initiated a handover between a source gNB and a destination gNB. Such indication can come from a virtualized control plane in some examples. In other examples, the UPF can determine a handover is occurring when downlink packets are set to route to a new gNB, for example as a result in routing updates occurring when employing method 1200. At block 1405, the NE/UPF receives a first downlink packet sent from a correspondent node to the UE. The first downlink packet may be received on an upstream interface. In this context, the first downlink packet may be the first downlink packet received after and/or during initiation of a handover. Based on a determination that a handover is in process, the NE/UPF writes a start buffering command into the first downlink packet. At block 1407, the UPF/NE transmits the first downlink packet to the destination gNB over a downstream interface.

At block 1409, the UPF/NE receives a second downlink packet on the upstream interface. The second downlink packet is sent from the correspondent node to the UE. It should be noted that the second downlink packet may or may not immediately follow the first downlink packet. The UPF/NE may determine whether the handover has been completed. In the event that the UPF/NE determines that the handover of the UE to the destination gNB is not complete, the UPF/NE writes a keep buffering command into the second downlink packet at block 1411. The UPF/NE can then transmit the second downlink packet over the downstream interface to the destination gNB.

At block 1413, the UPF/NE receives a third downlink packet on the upstream interface. The third downlink packet is sent from the correspondent node to the UE. The third downlink packet may or may not immediately follow the first downlink packet and/or the second downlink packet, depending on the example. At block 1415, the UPF/NE receives an indication that the handover of the UE to the destination gNB is complete. For example, such an indication can come from the control plane. At block 1417, the UPF/NE writes a buffer release command into the third downlink packet. The UPF/NE can then transmit the third downlink packet to the destination gNB to direct the destination gNB to release all buffered downlink packets to the UE. In some examples, the start buffering command, the keep buffering command, and the buffer release command are conditional commands set to control buffering only at a node with an address associated with the destination gNB. Further, the UPF/NE can write increasing sequence numbers in metadata of the first downlink packet, the second downlink packet, and the third downlink packet to support in order storage and transmission of such packets by the gNB upon completion of the handover.

In addition, method 1400 can be employed in conjunction with method 1200 and/or 1300. In such a case, the first downlink packet, the second downlink packet, and the third downlink packet are transmitted between the UPF and the destination gNB without traversing a network tunnel. Further, when method 1400 is employed in conjunction with method 1200, corresponding blocks of method 1200 can be included in method 1400. For example, the first, second, and/or third downlink packet may include a destination field containing an address of the UE. Further, the NE/UPF may set the destination field of the first, second, and/or third downlink packet to an address of the destination gNB. The NE/UPF can also write the UE address into metadata of the first, second, and/or third downlink packet and write a change destination command into the first, second, and/or third downlink packet. The change destination command in the first, second, and/or third downlink packet then directs the destination gNB to set the destination field of the first, second, and/or third downlink packet to the UE address in the metadata.

Figure 15:
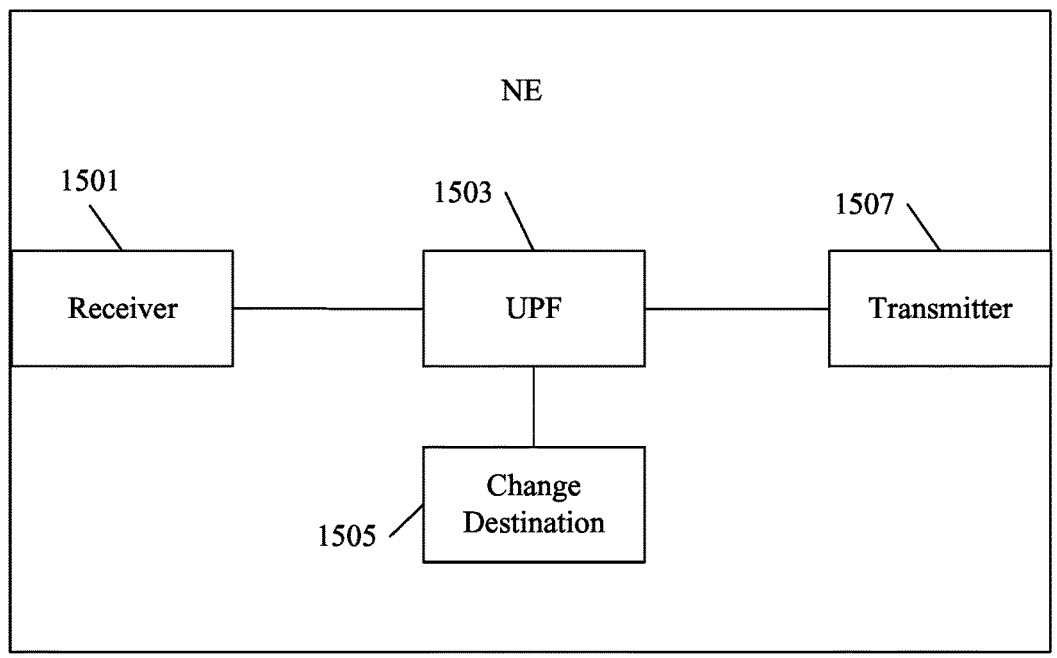
FIG. 15 is a schematic diagram of another embodiment of a NE including a UPF for managing data plane handover signaling.

FIG. 15 is a schematic diagram of another embodiment of a NE 1500 including a UPF for managing data plane handover signaling, for example by employing method 1200 and/or 1400. The NE 1500 includes a receiver 1501 for receiving an uplink packet from a UE anchored to a gNB, wherein the uplink packet includes a change destination command, a destination field, and metadata including a destination address for the uplink packet. The NE 1500 also includes a UPF module 1503 for executing a UPF. The NE 1500 also includes a change destination module 1505 for executing the change destination command in the uplink packet by setting the destination field of the uplink packet to the destination address in the metadata. The NE 1500 also includes a transmitter 1507 for transmitting the uplink packet to the destination address set in the destination field.

Figure 16:
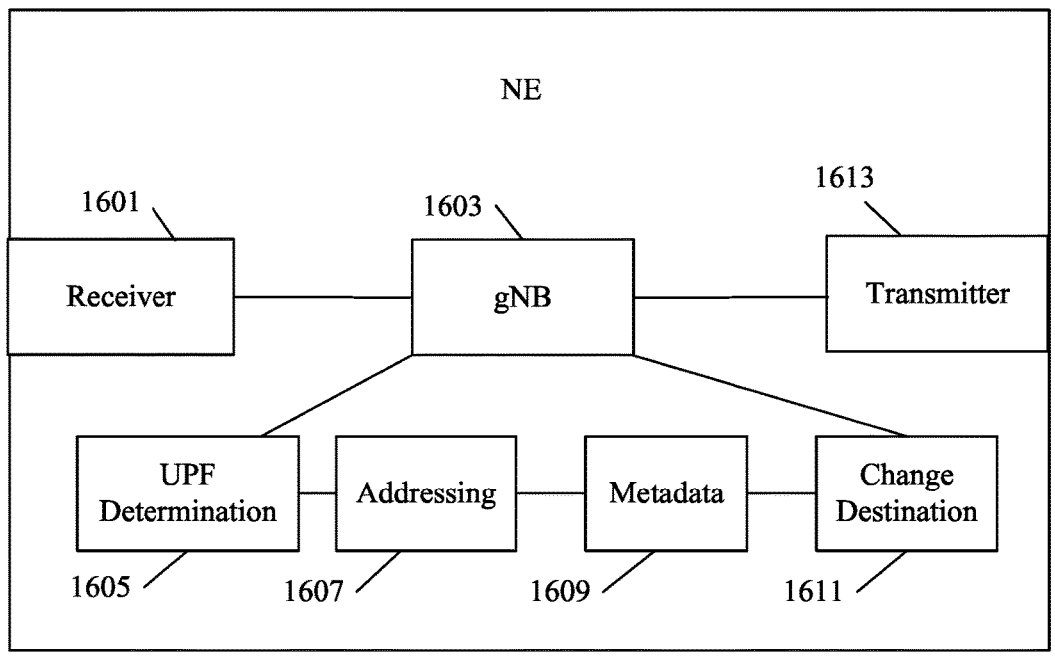
FIG. 16 is a schematic diagram of another embodiment of a NE for managing data plane handover signaling.

FIG. 16 is a schematic diagram of another embodiment of a NE 1600 for managing data plane handover signaling, for example by employing method 1300. The NE 1600 includes a receiver 1601 for receiving an uplink packet from a UE, wherein the uplink packet includes a destination field set to a correspondent node. The NE 1600 also includes a gNB module 1603 for operating a gNB. The NE 1600 also includes a UPF determination module 1605 for determining a UPF associated with the uplink packet. The NE 1600 also includes an addressing module 1607 for setting the destination field of the uplink packet to an address of the UPF. The NE 1600 also includes a metadata writing module 1609 for writing an address of the correspondent node into metadata of the uplink packet. The NE 1600 also includes a change destination command module 1611 for writing a change destination command into the uplink packet, wherein the change destination command in the uplink packet directs the UPF to set the destination field of the uplink packet to the correspondent node address in the metadata. The NE 1600 also includes a transmitter 1613 for transmitting the uplink packet to the UPF based on the destination field.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a network element (NE) including a user plane function (UPF), the method comprising:
   executing, by a processor of the NE, the UPF;
   receiving, by a downstream receiver of the NE, an uplink packet from a user equipment (UE) anchored to a fifth generation radio access network (5G) base station (gNB), wherein the uplink packet includes a change destination command, a destination field, and metadata including a destination address for the uplink packet;
   executing, by the processor, the change destination command in the uplink packet by setting the destination field of the uplink packet to the destination address in the metadata; and
   transmitting, by an upstream transmitter of the NE, the uplink packet to the destination address set in the destination field.

2. The method of claim 1, wherein the destination field is set to an address of the UPF prior to execution of the change destination command.

3. The method of claim 1, wherein the change destination command is a conditional command set to initiate the change destination command only at the NE including a network address associated with the UPF.

4. The method of claim 1, further comprising:
   receiving, by an upstream receiver of the NE, a downlink packet from a correspondent node, wherein the downlink packet includes a destination field set to the UE;
   determining, by the processor, that the UE is anchored to the 5G gNB;
   setting, by the processor, the destination field of the downlink packet to an address of the 5G gNB;

writing, by the processor, an address of the UE into metadata of the downlink packet;

writing, by the processor, a change destination command into the downlink packet, wherein the change destination command in the downlink packet directs the 5G gNB to set the destination field of the downlink packet to the UE address in the metadata; and transmitting, by a downstream transmitter of the NE, the downlink packet to the 5G gNB based on the destination field.

5. The method of claim 4, wherein the uplink packet and the downlink packet are communicated between the UPF and the 5G gNB without traversing a network tunnel.

6. A method implemented by a fifth generation radio access network (5G) base station (gNB), the method comprising:

receiving, by a downstream receiver of the 5G gNB, an uplink packet from a user equipment (UE), wherein the uplink packet includes a destination field set to a correspondent node;

determining, by a processor of the 5G gNB, a user plane function (UPF) associated with the uplink packet;

setting, by the processor, the destination field of the uplink packet to an address of the UPF;

writing, by the processor, an address of the correspondent node into metadata of the uplink packet;

writing, by the processor, a change destination command into the uplink packet, wherein the change destination command in the uplink packet directs the UPF to set the destination field of the uplink packet to the correspondent node address in the metadata; and transmitting, by an upstream transmitter of the 5G gNB, the uplink packet to the UPF based on the destination field.

7. The method of claim 6, wherein the change destination command is a conditional command set to initiate the change destination command only at a network element (NE) including a network address associated with the UPF.

8. The method of claim 6, further comprising:

receiving, by an upstream receiver of the 5G gNB, a downlink packet from the UPF, wherein the downlink packet includes a change destination command and a destination field set as the 5G gNB;

executing, by the processor, the change destination command in the downlink packet by setting the destination field of the downlink packet to a destination address of the UE in the metadata; and transmitting, by a downstream transmitter of the 5G gNB, the downlink packet to the UE at the destination address set in the destination field.

9. The method of claim 8, wherein the uplink packet and the downlink packet are communicated between the UPF and the 5G gNB without traversing a network tunnel.

10. The method of claim 8, wherein the downlink packet includes a start buffering command, the method further comprising executing, by the processor, the start buffering command by:

obtaining, by the processor, a sequence number of the downlink packet from downlink packet metadata; and storing, by the processor, the downlink packet and the sequence number in a buffer of the 5G gNB.

11. The method of claim 8, wherein the downlink packet includes a keep buffering command, the method further comprising executing, by the processor, the keep buffering command by:

obtaining, by the processor, a sequence number of the downlink packet from downlink packet metadata; and storing, by the processor, the downlink packet and the sequence number in a buffer of the 5G gNB.

12. The method of claim 8, wherein the downlink packet includes a release buffer command, the method further comprising executing, by the processor, the release buffer command by transmitting to the UE, by the downstream transmitter, packets stored in a buffer based on sequence numbers for the packets.

13. A fifth generation radio access network (5G) base station (gNB) comprising:

a downstream receiver configured to receive an uplink packet from a user equipment (UE), wherein the uplink packet includes a destination field set to a correspondent node;

a processor coupled to the downstream receiver and configured to:

determine a user plane function (UPF) associated with the uplink packet;

set the destination field of the uplink packet to an address of the UPF;

write an address of the correspondent node into metadata of the uplink packet; and write a change destination command into the uplink packet, wherein the change destination command in the uplink packet directs the UPF to set the destination field of the uplink packet to the correspondent node address in the metadata; and an upstream transmitter configured to transmit the uplink packet to the UPF based on the destination field.

14. The 5G gNB of claim 13, wherein the change destination command is a conditional command set to initiate the change destination command only at a network element (NE) including a network address associated with the UPF.

15. The 5G gNB of claim 13, further comprising:

an upstream receiver coupled to the processor and configured to receive a downlink packet from the UPF, wherein the downlink packet includes a change destination command and a destination field set as the 5G gNB, wherein the processor is further configured to execute the change destination command in the downlink packet by setting the destination field of the downlink packet to a destination address of the UE in the metadata; and a downstream transmitter coupled to the processor and configured to transmit the downlink packet to the UE at the destination address set in the destination field.

16. The 5G gNB of claim 15, wherein the uplink packet and the downlink packet are communicated between the UPF and the 5G gNB without traversing a network tunnel.

17. The SG gNB of claim 15, wherein the downlink packet includes a start buffering command, and wherein the processor is further configured to execute the start buffering command by obtaining a sequence number of the downlink packet from downlink packet metadata, and storing the downlink packet and the sequence number in a buffer of the 5G gNB.

18. The 5G gNB of claim 15, wherein the downlink packet includes a keep buffering command, and wherein the processor is further configured to execute the keep buffering command by obtaining a sequence number of the downlink packet from downlink packet metadata, and storing the downlink packet and the sequence number in a buffer of the 5G gNB.

19. The 5G gNB of claim 15, wherein the downlink packet includes a release buffer command, and wherein the processor is further configured to execute the release buffer command by transmitting to the UE, via the downstream transmitter, packets stored in a buffer based on sequence numbers for the packets.

\* \* \* \* \*